(12) United States Patent
Lee et al.

(10) Patent No.: US 9,055,300 B2
(45) Date of Patent: Jun. 9, 2015

(54) METHOD AND APPARATUS FOR ENCODING/DECODING IMAGE WITH REFERENCE TO A PLURALITY OF FRAMES

(75) Inventors: Tammy Lee, Seoul (KR); Jung-hye Min, Suwon-si (KR); Woo-jin Han, Suwon-si (KR); Sun-il Lee, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 821 days.

(21) Appl. No.: 12/914,373

(22) Filed: Oct. 28, 2010

(65) Prior Publication Data

US 2011/0097004 A1 Apr. 28, 2011

(30) Foreign Application Priority Data

Oct. 28, 2009 (KR) ........................ 10-2009-0102719

(51) Int. Cl.
G06K 9/36 (2006.01)
H04N 7/12 (2006.01)
H04N 19/51 (2014.01)
H04N 19/52 (2014.01)

(52) U.S. Cl.
CPC ............... *H04N 19/51* (2013.01); *H04N 19/52* (2013.01)

(58) Field of Classification Search
None
See application file for complete search history.

(56) References Cited

U.S. PATENT DOCUMENTS

| 6,052,149 | A | * | 4/2000 | Barnaby ................ 375/240.24 |
| RE37,222 | E | * | 6/2001 | Yonemitsu et al. ...... 375/240.16 |
| 6,438,165 | B2 | * | 8/2002 | Normile ........................ 375/240 |
| 6,546,049 | B1 | * | 4/2003 | Lee ........................... 375/240.03 |
| 7,023,923 | B2 | | 4/2006 | Turaga et al. |
| 7,609,763 | B2 | * | 10/2009 | Mukerjee et al. ........ 375/240.16 |
| 8,139,877 | B2 | * | 3/2012 | Nakamura et al. ............ 382/236 |
| 8,374,240 | B1 | * | 2/2013 | Namboodiri et al. ..... 375/240.12 |
| 8,406,569 | B2 | * | 3/2013 | Segall et al. .................. 382/294 |
| 2003/0128754 | A1 | * | 7/2003 | Akimoto et al. ......... 375/240.02 |
| 2003/0202599 | A1 | | 10/2003 | Turaga et al. |
| 2004/0008784 | A1 | * | 1/2004 | Kikuchi et al. .......... 375/240.16 |
| 2004/0036782 | A1 | * | 2/2004 | Knapp ........................ 348/239 |
| 2004/0057515 | A1 | * | 3/2004 | Koto et al. ............... 375/240.14 |
| 2004/0057523 | A1 | * | 3/2004 | Koto et al. ............... 375/240.26 |
| 2004/0161157 | A1 | * | 8/2004 | Sato et al. ...................... 382/236 |
| 2004/0223548 | A1 | * | 11/2004 | Kato et al. ............... 375/240.16 |
| 2005/0152452 | A1 | * | 7/2005 | Suzuki ..................... 375/240.16 |

(Continued)

FOREIGN PATENT DOCUMENTS

CN 1650633 A 8/2005
KR 10-2003-0078772 A 10/2003

(Continued)

OTHER PUBLICATIONS

International Search Report dated Jun. 1, 2011 from the International Searching Authority in counterpart international application No. PCT/KR2010/007488.

(Continued)

*Primary Examiner* — Wenpeng Chen
(74) *Attorney, Agent, or Firm* — Sughrue Mion, PLLC

(57) ABSTRACT

An image encoder generates a reference frame by modifying a previously encoded frame and encodes a current block of a current frame based on a group including the previously encoded frame and the reference frame, wherein in the encoding of the current block, a reference to a first frame included in the group is considered to be the same as a reference to any other frame included in the group.

42 Claims, 15 Drawing Sheets

(56) References Cited

U.S. PATENT DOCUMENTS

| | | | |
|---|---|---|---|
| 2005/0243917 A1* | 11/2005 | Lee | 375/240.03 |
| 2005/0265451 A1* | 12/2005 | Shi et al. | 375/240.15 |
| 2006/0126962 A1* | 6/2006 | Sun | 382/268 |
| 2006/0165302 A1* | 7/2006 | Han et al. | 382/240 |
| 2006/0182179 A1* | 8/2006 | Han | 375/240.16 |
| 2006/0269153 A1* | 11/2006 | Shi et al. | 382/236 |
| 2006/0291562 A1* | 12/2006 | Lee et al. | 375/240.16 |
| 2007/0071100 A1* | 3/2007 | Shi et al. | 375/240.16 |
| 2007/0171974 A1 | 7/2007 | Baik | |
| 2007/0230563 A1* | 10/2007 | Tian et al. | 375/240.01 |
| 2007/0230578 A1* | 10/2007 | Shi et al. | 375/240.16 |
| 2008/0187052 A1* | 8/2008 | Terada et al. | 375/240.24 |
| 2008/0284908 A1* | 11/2008 | Chang | 348/452 |
| 2009/0060470 A1* | 3/2009 | Kurauchi | 386/124 |
| 2009/0086034 A1* | 4/2009 | Nakamura et al. | 348/208.4 |
| 2010/0002770 A1* | 1/2010 | Motta et al. | 375/240.16 |
| 2010/0007534 A1* | 1/2010 | Girardeau, Jr. | 341/107 |
| 2010/0027665 A1* | 2/2010 | Pinhasov et al. | 375/240.16 |
| 2010/0061461 A1* | 3/2010 | Bankoski et al. | 375/240.16 |
| 2011/0206289 A1* | 8/2011 | Dikbas et al. | 382/238 |
| 2012/0287229 A1* | 11/2012 | Yang et al. | 348/14.09 |

FOREIGN PATENT DOCUMENTS

| | | |
|---|---|---|
| KR | 10-2004-0106417 A | 12/2004 |
| KR | 10-0728031 B1 | 6/2007 |

OTHER PUBLICATIONS

Communication dated Jul. 24, 2014 from the State Intellectual Property Office of P.R. China in a counterpart application No. 201080049348.X.

* cited by examiner

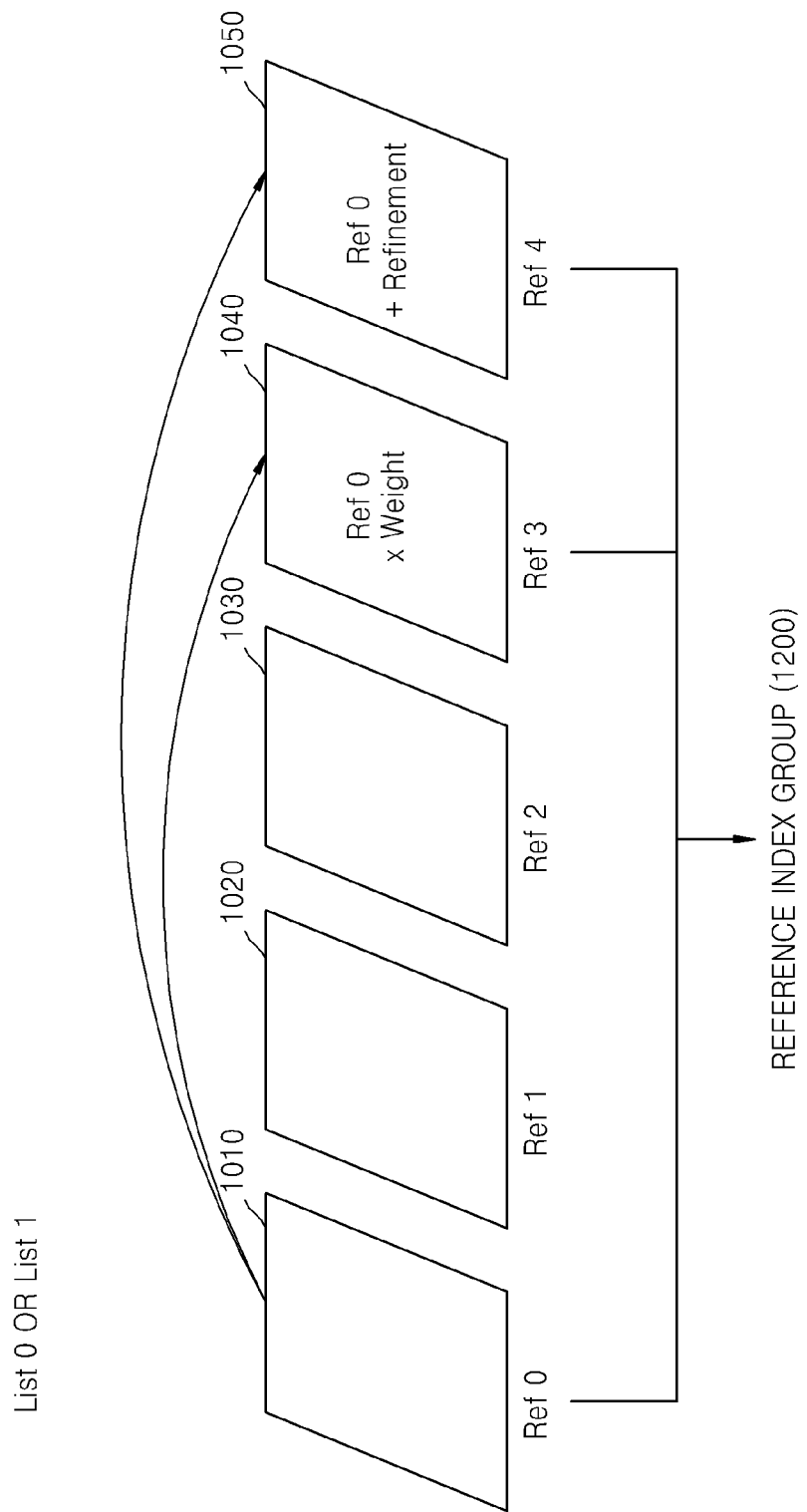

METHOD AND APPARATUS FOR ENCODING/DECODING IMAGE WITH REFERENCE TO A PLURALITY OF FRAMES

CROSS-REFERENCE TO RELATED PATENT APPLICATION

This application claims priority from Korean Patent Application No. 10-2009-0102719, filed on Oct. 28, 2009 in the Korean Intellectual Property Office, the disclosure of which is incorporated herein in its entirety by reference.

BACKGROUND

1. Field

Exemplary embodiments relate to methods and apparatuses for encoding and decoding images, and more particularly, to methods and apparatuses for encoding and decoding images with reference to a plurality of frames.

2. Description of the Related Art

In an image compression method, such as Moving Picture Experts Group (MPEG)-1, MPEG-2, MPEG-4 H.264/MPEG-4 Advanced Video Coding (AVC), etc., an image is divided into blocks having predetermined sizes in order to encode the image, and each block is prediction-encoded by using inter prediction or intra prediction.

Inter prediction includes searching at least one reference frame for a same or similar block as a current block, estimating motion of the current block, encoding a motion vector generated as a result of estimating the motion together with a pixel value, and inserting the motion vector and the pixel value into a bitstream.

SUMMARY

One or more exemplary embodiments provide methods and apparatuses for encoding images, methods and apparatuses for decoding images, and computer readable recording media storing computer readable programs for executing the methods.

According to an aspect of an exemplary embodiment, there is provided a method of encoding an image, the method including: generating a reference frame by modifying a previously encoded frame; and encoding a current block based on a group including the previously encoded frame and the reference frame, wherein, when the current block is encoded, a reference to a first frame included in the group is considered to be the same as a reference to any other frame included in the group.

The first frame may be the reference frame or the previously encoded frame.

The encoding the current block may include: estimating a motion vector of the current block by searching the first frame; predicting the motion vector of the current block based on a motion vector of a block that refers to a frame included in the group from among at least one previously encoded block adjacent to the current block; and encoding the motion vector of the current block based on a result of the predicting.

The predicting the motion vector may include predicting the motion vector of the current block based on a median of motion vectors of a plurality of blocks that refer to frames included in the group from among the at least one previously encoded block adjacent to the current block.

The encoding the current block may include prediction-encoding the current block based on the motion vector.

The encoding the current block may include: determining whether the current block and a block adjacent to the current block both refer to one or more frames included in the group; setting a boundary strength (Bs) for deblocking filtering based on a result of the determining; and deblocking filtering a boundary between the current block and the block adjacent to the current block based on the boundary strength (Bs).

The setting the boundary strength (Bs) may include, when the current block and the block adjacent to the current block both refer to the frames included in the group, as a result of the determining, considering that the current block and the block adjacent to the current block refer to the same frame, and setting the boundary strength (Bs) for deblocking filtering accordingly.

The reference frame may be generated by at least one of adding a predetermined value to pixel values of the previously encoded frame and multiplying the previously encoded frame by a predetermined value.

The reference frame may be generated by performing a geometric transformation on the previously encoded frame, and wherein the geometric transformation includes at least one of homogeneous transformation, perspective transformation and affine transformation.

According to an aspect of another exemplary embodiment, there is provided a method of decoding an image, the method including: generating a reference frame by modifying a previously decoded frame; and decoding a current block based on a group including the previously decoded frame and the reference frame, wherein, when the current block is decoded, a reference to a first frame included in the group is considered to be the same as a reference to any other frame included in the group.

According to an aspect of another exemplary embodiment, there is provided an apparatus for encoding an image, the apparatus including: a reference frame generator which generates a reference frame by modifying a previously encoded frame; an image encoder which encodes a current block based on a group including the previously encoded frame and the reference frame, wherein, when the current block is encoded, a reference to a first frame included in the group is considered to be the same as a reference to any other frame included in the group.

According to an aspect of another exemplary embodiment, there is provided an apparatus for decoding an image, the apparatus including: a reference frame generator which generates a reference frame by modifying a previously decoded frame; and an image decoder which decodes a current block based on a group including the previously decoded frame and the reference frame, wherein, when the current block is decoded, a reference to a first frame included in the group is considered to be the same as a reference to any other frame included in the group.

According to an aspect of another exemplary embodiment, there is provided a computer readable recording medium storing a computer readable program for executing the encoding or decoding method.

According to an aspect of another exemplary embodiment, there is provided a method of decoding an image, the method including: decoding a current block of a current frame based on a group comprising a plurality of reference frames, wherein, in the decoding the current block, a reference to a first frame of the plurality of reference frames is considered to be the same as a reference to any other frame of the plurality of reference frames.

According to an aspect of another exemplary embodiment, there is provided a method of encoding an image, the method including: encoding a current block of a current frame based on a group comprising a plurality of reference frames, wherein in the encoding the current block, a reference to a first frame of the plurality of reference frames is considered to be the same as a reference to any other frame of the plurality of reference frames.

BRIEF DESCRIPTION OF THE DRAWINGS

The above and/or other aspects will become more apparent by describing in detail exemplary embodiments with reference to the attached drawings in which:

FIG. 12 illustrates a reference index group of reference frames according to an exemplary embodiment;

DETAILED DESCRIPTION OF EXEMPLARY EMBODIMENTS

Figure 1:
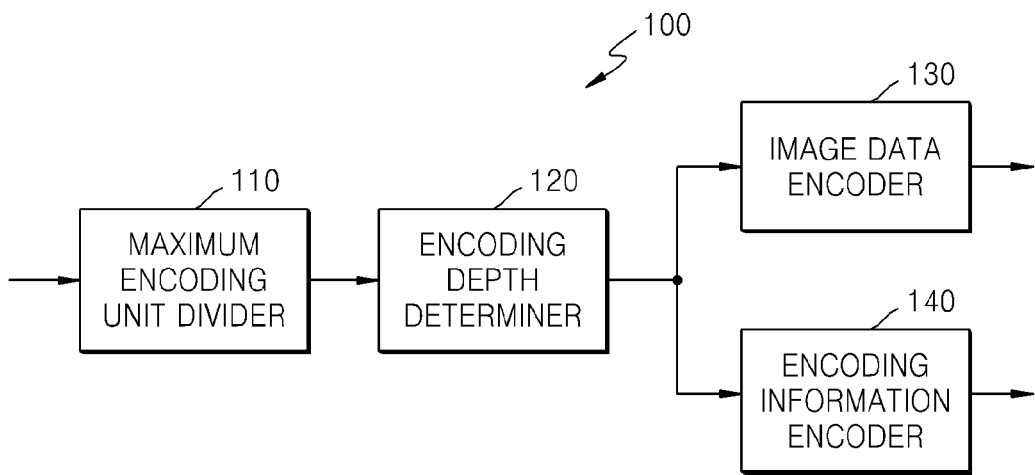
FIG. 1 is a block diagram of an apparatus for encoding an image according to an exemplary embodiment.

Exemplary embodiments will now be described more fully with reference to the accompanying drawings, in which like reference numerals refer to like elements throughout. Expressions such as "at least one of," when preceding a list of elements, modify the entire list of elements and do not modify the individual elements of the list. In the present specification, an "image" may denote a still image of a video or a moving image, i.e., the video itself.

FIG. 1 is a block diagram of an apparatus 100 for encoding an image, according to an exemplary embodiment. Referring to FIG. 1, the apparatus 100 includes a maximum coding unit divider 110, an encoding depth determiner 120, an image data encoder 130, and an encoding information encoder 140.

The maximum coding unit divider 110 may divide a current frame or slice based on a maximum coding unit that is an encoding unit of the largest size. That is, the maximum coding unit divider 110 may divide the current frame or slice to obtain at least one maximum coding unit.

According to an exemplary embodiment, a coding unit may be represented using a maximum coding unit and a depth. As described above, the maximum coding unit indicates a coding unit having the largest size from among coding units of the current frame, and the depth indicates a degree of hierarchically decreasing a coding unit. As a depth increases, a coding unit may decrease from a maximum coding unit to a minimum coding unit, wherein a depth of the maximum coding unit is defined as a minimum depth and a depth of the minimum coding unit is defined as a maximum depth. Since the size of a coding unit decreases from a maximum coding unit as a depth increases, a sub coding unit of a $k^{th}$ depth may include a plurality of sub coding units of a $(k+n)^{th}$ depth (where k and n are integers equal to or greater than 1).

According to an increase of the size of a frame to be encoded, encoding an image in a greater coding unit may cause a higher image compression ratio. However, if a greater coding unit is fixed, an image may not be efficiently encoded by reflecting continuously changing image characteristics.

For example, when a smooth area such as the sea or sky is encoded, the greater a coding unit is, the more a compression ration may increase. However, when a complex area such as people or buildings is encoded, the smaller a coding unit is, the more a compression ration may increase.

Accordingly, according to an exemplary embodiment, a maximum image coding unit having a different size and a different maximum depth having a different size may be set for each frame or slice. Since a maximum depth denotes the maximum number of times by which a coding unit can decrease, the size of each minimum coding unit included in a maximum image coding unit may be variably set according to a maximum depth.

The encoding depth determiner 120 determines a maximum depth. The maximum depth may be determined based on a calculation of Rate-Distortion (R-D) cost. The maximum depth may be determined differently for each frame or slice or for each maximum coding unit. The determined maximum depth is provided to the encoding information encoder 140, and image data according to maximum coding units is provided to the image data encoder 130.

The maximum depth denotes a coding unit having the smallest size that may be included in a maximum coding unit, i.e., a minimum coding unit. That is, a maximum coding unit may be divided into sub coding units having different sizes according to different depths, which will be described in detail below with reference to FIGS. 8A though 8D. In addition, the sub coding units having different sizes that are included in the maximum coding unit may be predicted or transformed based on processing units having different sizes. That is, the apparatus 100 may perform a plurality of processing operations for image encoding based on processing units having various sizes and various shapes. To encode image data, processing operations such as at least one of prediction, transformation, and entropy encoding are performed, wherein processing units having the same size may be used for every operation or processing units having different sizes may be used for every operation.

For example, the apparatus 100 may select a processing unit that is different from a coding unit to predict a predetermined coding unit.

When the size of a coding unit is 2N×2N (where N is a positive integer), processing units for prediction may be 2N×2N, 2N×N, N×2N, and N×N. That is, motion prediction may be performed based on a processing unit having a shape whereby at least one of a height and a width of a coding unit is equally divided by two. Hereinafter, a processing unit that is the base of prediction is defined as a prediction unit.

A prediction mode may be at least one of an intra mode, an inter mode, and a skip mode, and a specific prediction mode may be performed for only a prediction unit having a specific size or shape. For example, the intra mode may be performed for only prediction units having the sizes of 2N×2N and N×N of which the shape is a square. Further, the skip mode may be performed for only a prediction unit having the size of 2N×2N. If a plurality of prediction units exist in a coding unit, the prediction mode with the least encoding errors may be selected after performing prediction for every prediction unit.

According to another exemplary embodiment, the apparatus 100 may perform frequency transformation on image data based on a processing unit having a different size from a coding unit. For the frequency transformation in the coding unit, the frequency transformation may be performed based on a processing unit having a size equal to or smaller than that of the coding unit. Hereinafter, a processing unit that is the base of frequency transformation is defined as a transformation unit. The frequency transformation may be a Discrete Cosine Transform (DCT) or a Karhunen Loeve Transform (KLT).

The encoding depth determiner 120 may determine sub coding units included in a maximum coding unit using RD optimization based on a Lagrangian multiplier. That is, the encoding depth determiner 120 may determine which shape a plurality of sub coding units divided from the maximum coding unit have, wherein the plurality of sub coding units have different sizes according to their depths. The image data encoder 130 outputs a bitstream by encoding the maximum coding unit based on the division shapes determined by the encoding depth determiner 120.

The encoding information encoder 140 encodes information about an encoding mode of the maximum coding unit determined by the encoding depth determiner 120. That is, the encoding information encoder 140 outputs a bitstream by encoding information about a division shape of the maximum coding unit, information about the maximum depth, and information about an encoding mode of a sub coding unit for each depth. The information about the encoding mode of the sub coding unit may include information about a prediction unit of the sub coding unit, information about a prediction mode for each prediction unit, and information about a transformation unit of the sub coding unit.

The information about the division shape of the maximum coding unit may indicate whether each coding unit is divided. For example, when the maximum coding unit is divided and encoded, information indicating whether the maximum coding unit is divided is encoded. Furthermore, when a sub coding unit generated by dividing the maximum coding unit is divided and encoded, information indicating whether each sub coding unit is divided is encoded. The information indicating whether the maximum coding unit is divided and the information indicating whether the sub coding unit is divided may be flag information indicating whether the maximum coding unit is divided and flag information indicating whether the sub coding unit is divided, respectively.

Since sub coding units having different sizes exist for each maximum coding unit and information about an encoding mode is to be determined for each sub coding unit, information about at least one encoding mode may be determined for one maximum coding unit.

The apparatus 100 may generate sub coding units by equally dividing both a height and a width of a maximum coding unit by two according to an increase of depth. That is, when the size of a coding unit of a $K^{th}$ depth is 2N×2N, the size of a coding unit of a $(k+1)^{th}$ depth may be N×N.

Accordingly, the apparatus 100 according to an exemplary embodiment may determine an optimal division shape for each maximum coding unit based on sizes of maximum coding units and a maximum depth in consideration of image characteristics. By variably adjusting the size of a maximum coding unit in consideration of image characteristics and encoding an image through division of a maximum coding unit into sub coding units of different depths, images having various resolutions may be more efficiently encoded.

Figure 2:
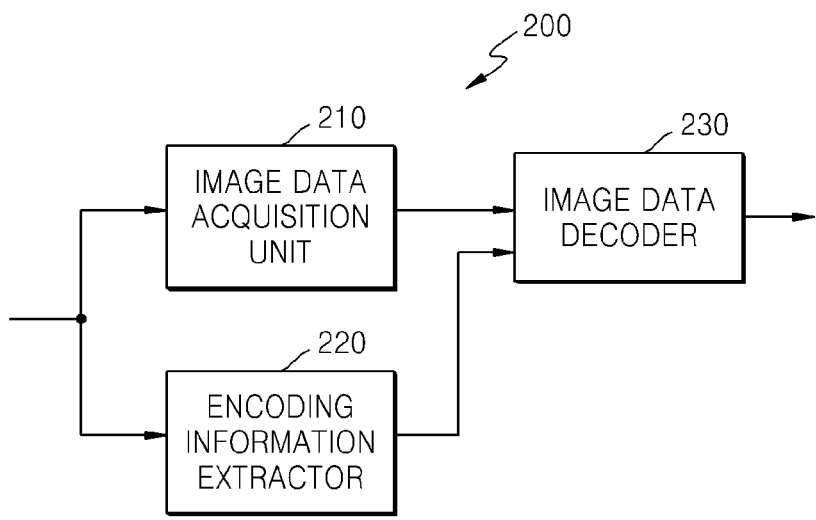
FIG. 2 is a block diagram of an apparatus for decoding an image according to an exemplary embodiment.

FIG. 2 is a block diagram of an apparatus 200 for decoding an image according to an exemplary embodiment. Referring to FIG. 2, the apparatus 200 includes an image data acquisition unit 210, an encoding information extractor 220, and an image data decoder 230.

The image data acquisition unit 210 acquires image data according to maximum coding units by parsing a bitstream received by the apparatus 200 and outputs the image data to the image data decoder 230. The image data acquisition unit 210 may extract information about a maximum coding unit of a current frame or slice from a header of the current frame or slice. Accordingly, the image data acquisition unit 210 can divide the bitstream by the maximum coding unit so that the image data decoder 230 may decode the image data according to maximum coding units.

The encoding information extractor 220 extracts information about a maximum coding unit, a maximum depth, a division shape of the maximum coding unit, and an encoding mode of sub coding units from the header of the current frame by parsing the bitstream received by the apparatus 200. The information about the division shape and the information about the encoding mode are provided to the image data decoder 230.

The information about the division shape of the maximum coding unit may include information about sub coding units having different sizes according to depths included in the maximum coding unit. Furthermore, the information about the division shape may include information (for example, flag information) indicating whether each coding unit is divided.

The information about the encoding mode may include information about a prediction unit according to sub coding units, information about a prediction mode, and information about transformation units.

The image data decoder 230 restores the current frame by decoding image data of every maximum coding unit based on the information extracted by the encoding information extractor 220.

The image data decoder 230 may decode sub coding units included in a maximum coding unit based on the information about a division shape of the maximum coding unit. A decoding process may include a prediction process including intra prediction and motion compensation and an inverse transformation process.

The image data decoder 230 may perform intra prediction or inter prediction based on the information about the prediction unit and the information about the prediction mode in order to predict a prediction unit. The image data decoder 230 may also perform inverse transformation for each sub coding unit based on information about a transformation unit of a sub coding unit.

Figure 3:
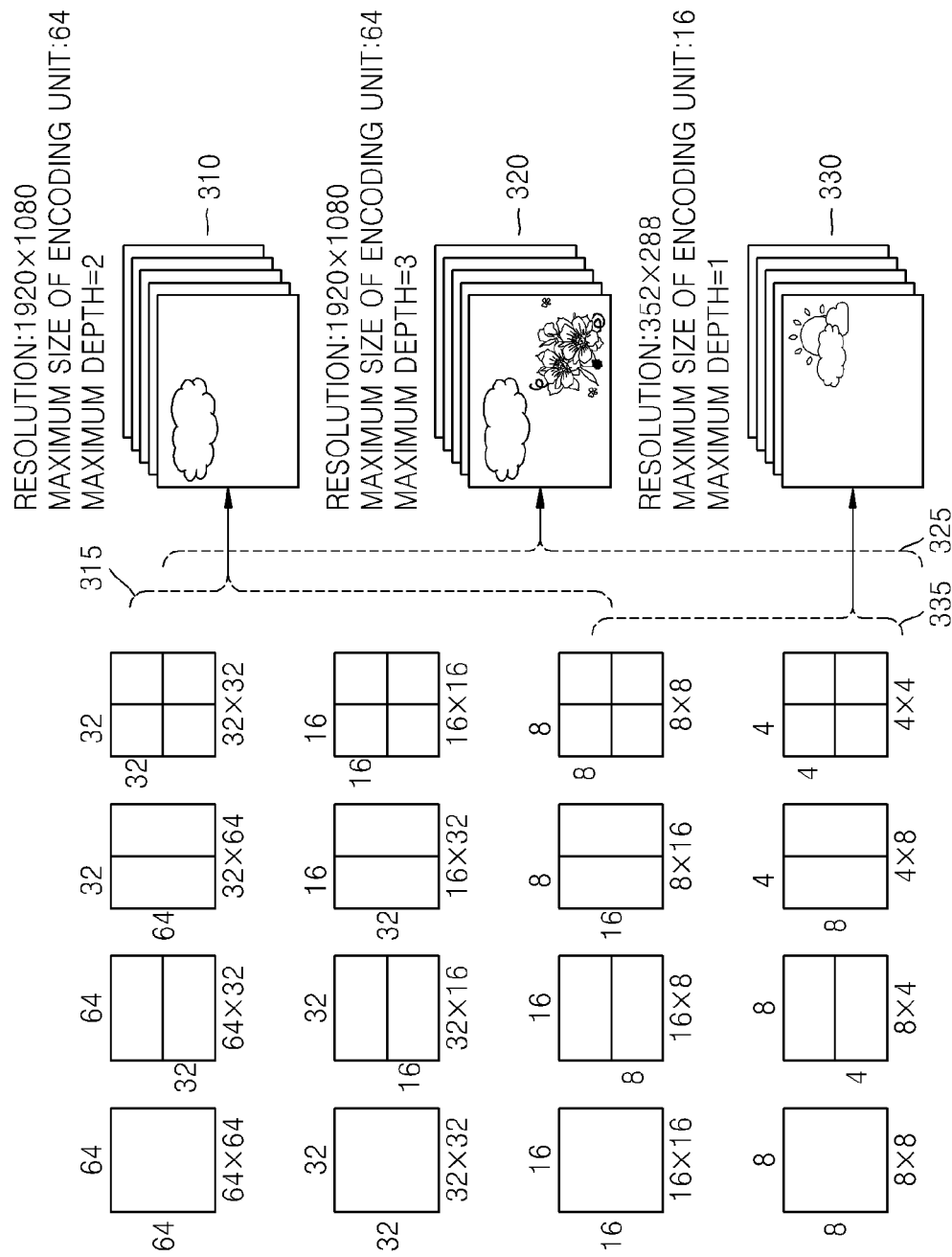
FIG. 3 illustrates hierarchical coding units according to an exemplary embodiment.

FIG. 3 illustrates hierarchical coding units according to an exemplary embodiment.

Referring to FIG. 3, the hierarchical coding units may include coding units whose width×heights are 64×64, 32×32, 16×16, 8×8, 4×4, etc. Furthermore, coding units that do not have a square shape, e.g., whose width×heights are 64×32, 32×64, 32×16, 16×32, 16×8, 8×16, 8×4, 4×8, etc., may exist.

Referring to FIG. 3, for first image data 310 whose resolution is 1920×1080, the size of a maximum coding unit is set to 64×64, and a maximum depth is set to 2.

For second image data 320 whose resolution is 1920×1080, the size of a maximum coding unit is set to 64×64, and a maximum depth is set to 3. For third image data 330 whose resolution is 352×288, the size of a maximum coding unit is set to 16×16, and a maximum depth is set to 1.

When the resolution is high or the amount of data is great, a maximum size of a coding unit may be relatively great to increase a compression ratio and reflect image characteristics. Accordingly, for the first and second image data 310 and 320 having a higher resolution than the third image data 330, 64×64 may be selected as the size of a maximum coding unit.

A maximum depth indicates the total number of layers in the hierarchical coding units. Since the maximum depth of the first image data 310 is 2, a coding unit 315 of the first image data 310 may include a maximum coding unit whose longer axis size is 64 and sub coding units whose longer axis sizes are 32 and 16, according to an increase of a depth.

In contrast, since the maximum depth of the third image data 330 is 1, a coding unit 335 of the third image data 330 may include a maximum coding unit whose longer axis size is 16 and coding units whose longer axis sizes is 8, according to an increase of a depth.

However, since the maximum depth of the second image data 320 is 3, a coding unit 325 of the second image data 320 may include a maximum coding unit whose longer axis size is 64 and sub coding units whose longer axis sizes are 32, 16, 8 and 4 according to an increase of a depth. Since an image is encoded based on a smaller sub coding unit as a depth increases, the present exemplary embodiment may be implemented for encoding an image including more minute scenes.

Figure 4:
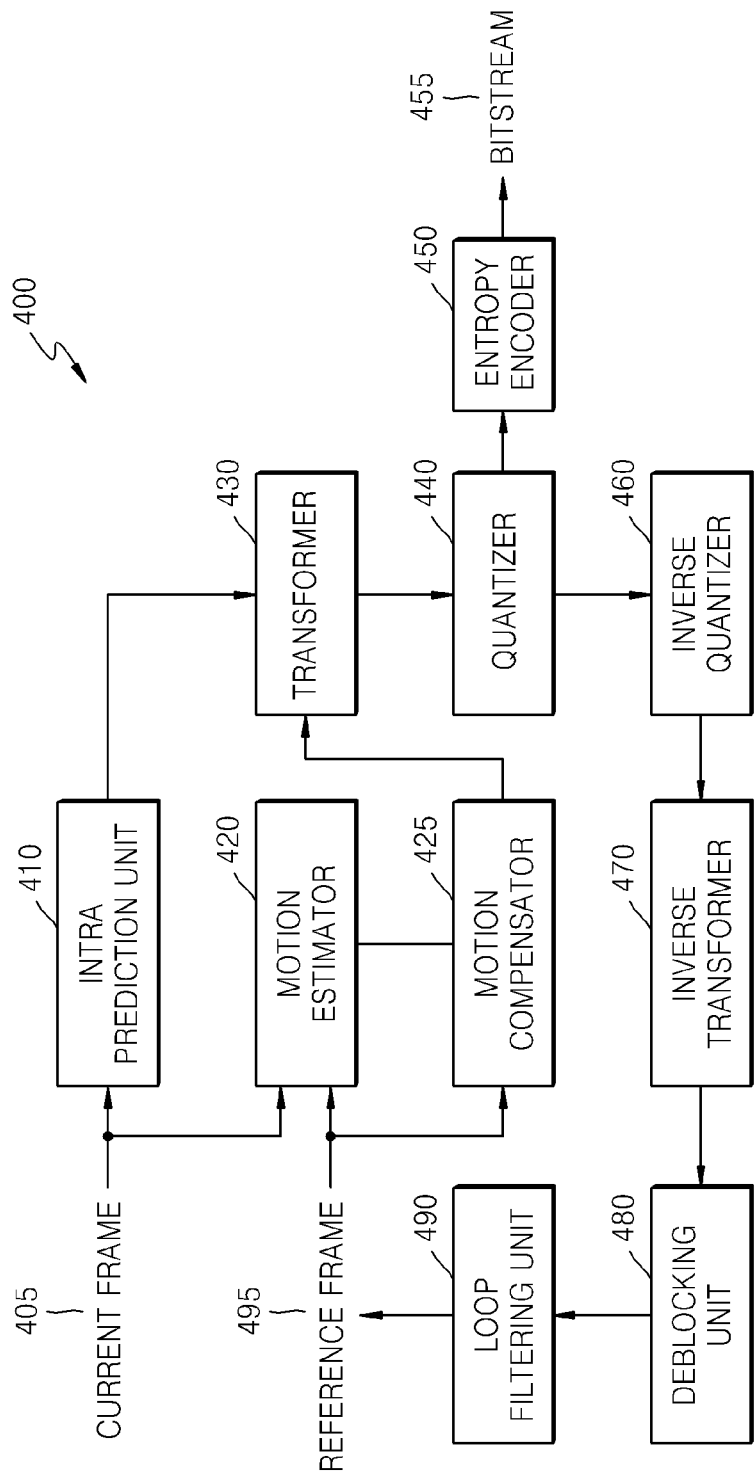
FIG. 4 is a block diagram of an image encoder based on a coding unit, according to an exemplary embodiment.

FIG. 4 is a block diagram of an image encoder 400 based on a coding unit, according to an exemplary embodiment.

Referring to FIG. 4, an intra predictor 410 performs intra prediction on prediction units of the intra mode in a current frame 405, and a motion estimator 420 and a motion compensator 425 perform inter prediction and motion compensation on prediction units of the inter mode by using the current frame 405 and a reference frame 495.

Residual values are generated based on the prediction units output from the intra predictor 410, the motion estimator 420, and the motion compensator 425, and the generated residual values are output as quantized transform coefficients by passing through a transformer 430 and a quantizer 440.

The quantized transform coefficients are restored to residual values by passing through an inverse-quantizer 460 and an inverse transformer 470. Furthermore, the restored residual values are post-processed by passing through a deblocking unit 480 and a loop filtering unit 490 and output as the reference frame 495. The quantized transform coefficients may be output as a bitstream 455 by passing through an entropy encoder 450.

To perform encoding based on an encoding method according to an exemplary embodiment, components of the image encoder 400, i.e., the intra predictor 410, the motion estimator 420, the motion compensator 425, the transformer 430, the quantizer 440, the entropy encoder 450, the inverse-quantizer 460, the inverse-transformer 470, the deblocking unit 480 and the loop filtering unit 490, perform image encoding processes based on a maximum coding unit, a sub coding unit according to depths, a prediction unit, and a transformation unit.

Figure 5:
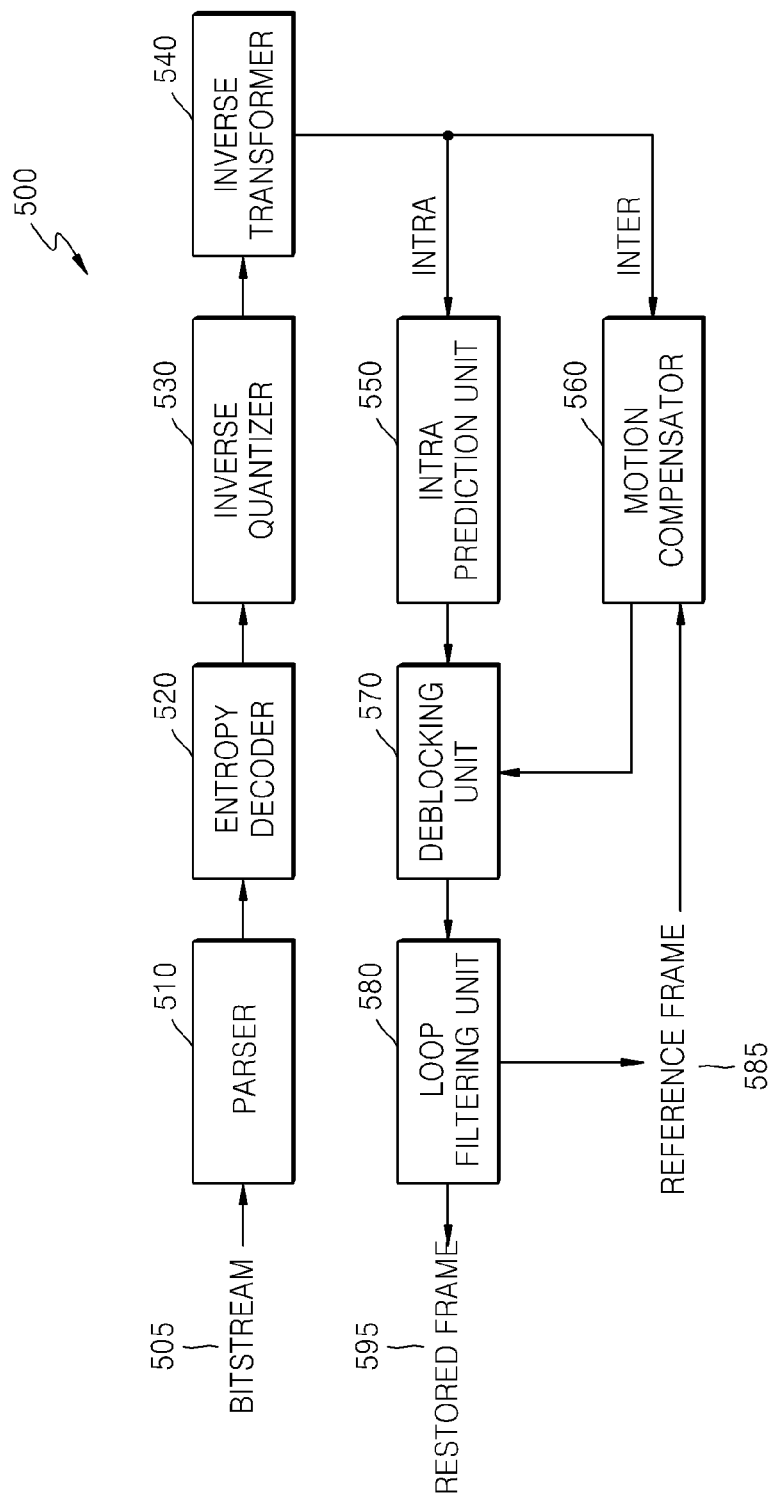
FIG. 5 is a block diagram of an image decoder based on a coding unit, according to an exemplary embodiment.

FIG. 5 is a block diagram of an image decoder 500 based on a coding unit, according to an exemplary embodiment.

Referring to FIG. 5, a bitstream 505 passes through a parser 510 so that encoded image data to be decoded and encoding information used for decoding are parsed. The encoded image data is output as inverse-quantized data by passing through an entropy decoder 520 and an inverse-quantizer 530 and restored to residual values by passing through an inverse-transformer 540. The residual values are restored according to coding units by being added to an intra prediction result of an intra predictor 550 or a motion compensation result of a motion compensator 560. The restored coding units are used for prediction of next coding units or a next frame by passing through a deblocking unit 570 and a loop filtering unit 580.

To perform decoding based on a decoding method according to an exemplary embodiment, components of the image decoder 500, i.e., the parser 510, the entropy decoder 520, the inverse-quantizer 530, the inverse-transformer 540, the intra predictor 550, the motion compensator 560, the deblocking unit 570 and the loop filtering unit 580, perform image decoding processes based on a maximum coding unit, a sub coding unit according to depths, a prediction unit, and a transformation unit.

In the present exemplary embodiment, the intra predictor 550 and the motion compensator 560 determine a prediction unit and a prediction mode in a sub coding unit by considering a maximum coding unit and a depth, and the inverse-transformer 540 performs inverse transformation by considering the size of a transformation unit.

Figure 6:
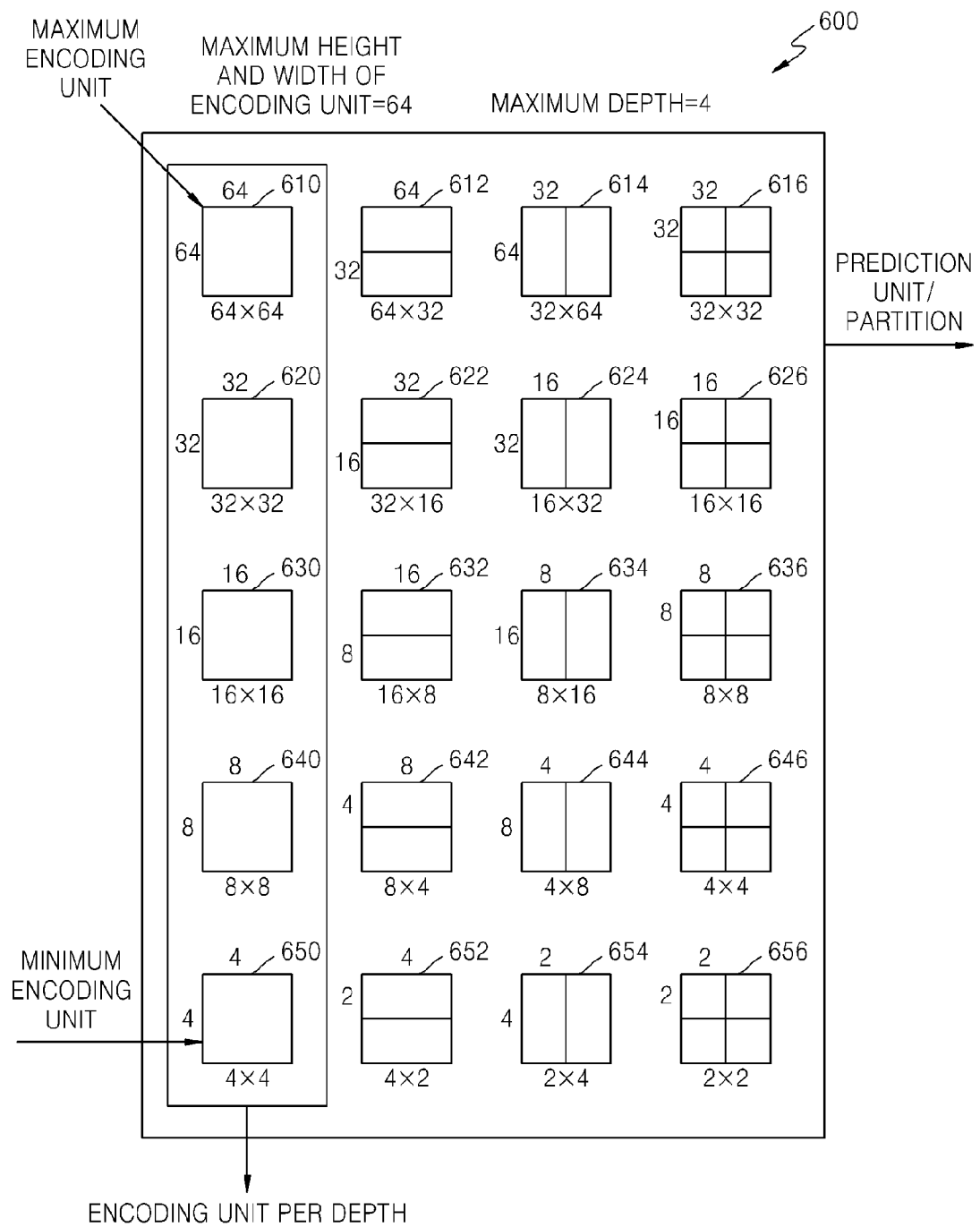
FIG. 6 illustrates a maximum coding unit, a sub coding unit, and a prediction unit, according to an exemplary embodiment.

FIG. 6 illustrates a maximum coding unit, a sub coding unit, and a prediction unit, according to an exemplary embodiment.

An encoding apparatus 100 and a decoding apparatus 200 according to exemplary embodiments use hierarchical coding units to perform encoding and decoding in consideration of image characteristics. A maximum coding unit and a maximum depth may be adaptively set according to the image characteristics or variously set according to requirements of a user.

Referring to FIG. 6, an exemplary hierarchical coding unit structure 600 according to an exemplary embodiment illustrates a maximum coding unit 610 whose height and width are 64 and maximum depth is 4. A depth increases along a vertical axis of the hierarchical coding unit structure 600, and as a depth increases, heights and widths of sub coding units 620 to 650 decrease. Prediction units of the maximum coding unit 610 and the sub coding units 620 to 650 are shown along a horizontal axis of the hierarchical coding unit structure 600.

The maximum coding unit 610 has a depth of 0 and the size of a coding unit, i.e., a height and a width, of 64×64. A depth increases along the vertical axis, and there exist a sub coding unit 620 whose size is 32×32 and depth is 1, a sub coding unit 630 whose size is 16×16 and depth is 2, a sub coding unit 640 whose size is 8×8 and depth is 3, and a sub coding unit 650 whose size is 4×4 and depth is 4. The sub coding unit 650 whose size is 4×4 and depth is 4 is a minimum coding unit, and the minimum coding unit may be divided into prediction units, each of which is less than the minimum coding unit.

Referring to FIG. 6, examples of a prediction unit are shown along the horizontal axis according to each depth. That is, a prediction unit of the maximum coding unit 610 whose depth is 0 may be a prediction unit whose size is equal to the coding unit 610, i.e., 64×64, or a prediction unit 612 whose size is 64×32, a prediction unit 614 whose size is 32×64, or a prediction unit 616 whose size is 32×32, which has a size smaller than the coding unit 610 whose size is 64×64.

A prediction unit of the coding unit 620 whose depth is 1 and size is 32×32 may be a prediction unit whose size is equal to the coding unit 620, i.e., 32×32, or a prediction unit 622 whose size is 32×16, a prediction unit 624 whose size is 16×32, or a prediction unit 626 whose size is 16×16, which has a size smaller than the coding unit 620 whose size is 32×32.

A prediction unit of the coding unit 630 whose depth is 2 and size is 16×16 may be a prediction unit whose size is equal to the coding unit 630, i.e., 16×16, or a prediction unit 632 whose size is 16×8, a prediction unit 634 whose size is 8×16, or a prediction unit 636 whose size is 8×8, which has a size smaller than the coding unit 630 whose size is 16×16.

A prediction unit of the coding unit 640 whose depth is 3 and size is 8×8 may be a prediction unit whose size is equal to the coding unit 640, i.e., 8×8, or a prediction unit 642 whose size is 8×4, a prediction unit 644 whose size is 4×8, or a prediction unit 646 whose size is 4×4, which has a size smaller than the coding unit 640 whose size is 8×8.

The coding unit 650 whose depth is 4 and size is 4×4 is a minimum coding unit and a coding unit of a maximum depth, and a prediction unit of the coding unit 650 may be a prediction unit 650 whose size is 4×4, a prediction unit 652 having a size of 4×2, a prediction unit 654 having a size of 2×4, or a prediction unit 656 having a size of 2×2.

Figure 7:
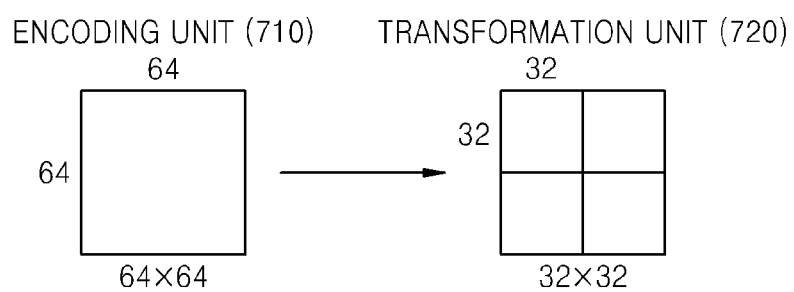
FIG. 7 illustrates a coding unit and a transformation unit, according to an exemplary embodiment.

FIG. 7 illustrates a coding unit and a transformation unit, according to an exemplary embodiment.

An encoding apparatus 100 and a decoding apparatus 200, according to exemplary embodiments perform encoding with a maximum coding unit itself or with sub coding units, which are equal to or smaller than the maximum coding unit, divided from the maximum coding unit. In the encoding process, the size of a transformation unit for frequency transformation is selected to be no larger than that of a corresponding coding unit. For example, referring to FIG. 7, when a current coding unit 710 has a size of 64×64, frequency transformation may be performed using a transformation unit 720 having a size of 32×32.

Figure 8A:
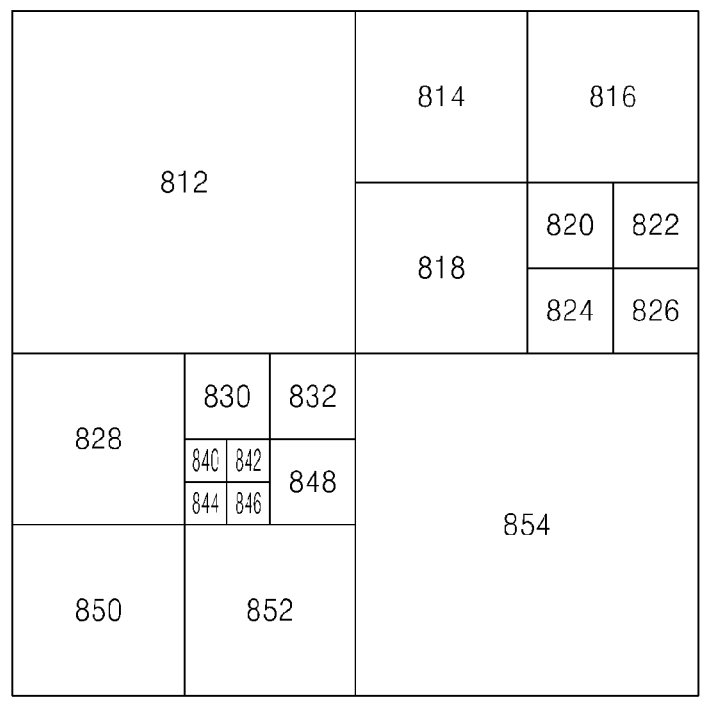
FIGS. 8A though 8D illustrate division shapes of a coding unit, a prediction unit, and a transformation unit, according to an exemplary embodiment.

FIGS. 8A though 8D illustrate division shapes of a coding unit, a prediction unit, and a transformation unit, according to an exemplary embodiment.

Figure 8B:
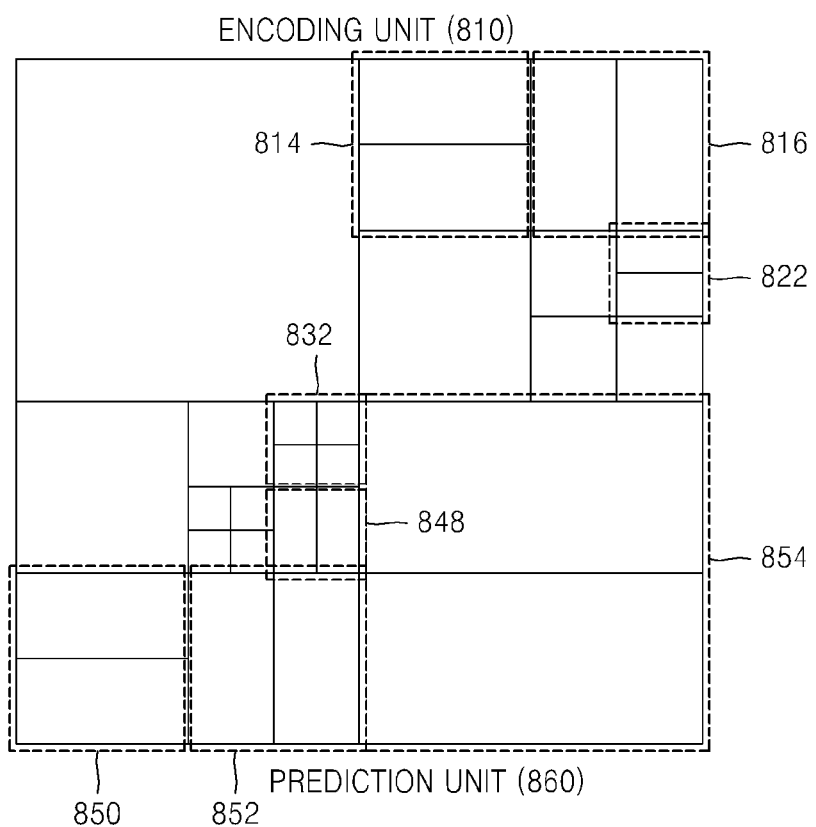

FIG. 8A illustrates a coding unit 810 and FIG. 8B illustrates a prediction unit 860, according to an exemplary embodiment.

FIG. 8A shows a division shape selected by an encoding apparatus 100 according to an exemplary embodiment in order to encode a maximum coding unit 810. The apparatus 100 divides the maximum coding unit 810 into various shapes, performs encoding, and selects an optimal division shape by comparing encoding results of various division shapes with each other based on an RD cost. When it is determined that the maximum coding unit 810 is to encoded as is, the maximum coding unit 810 may be encoded without dividing the maximum coding unit 810 as illustrated in FIGS. 8A though 8D.

Referring to FIG. 8A, the maximum coding unit 810 whose depth is 0 is encoded by dividing it into sub coding units whose depths are equal to or greater than 1. That is, the maximum coding unit 810 is divided into 4 sub coding units whose depths are 1, and all or some of the sub coding units whose depths are 1 are divided into sub coding units whose depths are 2.

A sub coding unit located in an upper-right side and a sub coding unit located in a lower-left side among the sub coding units whose depths are 1 are divided into sub coding units whose depths are equal to or greater than 2. Some of the sub coding units whose depths are equal to or greater than 2 may be divided into sub coding units whose depths are equal to or greater than 3.

Furthermore, FIG. 8B shows a division shape of a prediction unit 860 for the maximum coding unit 810.

The prediction unit 860 for the maximum coding unit 810 may be divided differently from the maximum coding unit 810. That is, a prediction unit for each of sub coding units may be smaller than a corresponding sub coding unit.

For example, a prediction unit for a sub coding unit 854 located in a lower-right side among the sub coding units whose depths are 1 may be smaller than the sub coding unit 854. In addition, prediction units for some (814, 816, 850, and 852) of sub coding units 814, 816, 818, 828, 850, and 852 whose depths are 2 may be smaller than the sub coding units 814, 816, 850, and 852, respectively.

In addition, prediction units for sub coding units 822, 832, and 848 whose depths are 3 may be smaller than the sub coding units 822, 832, and 848, respectively. The prediction units may have a shape whereby respective sub coding units are equally divided by two in a direction of height or width or have a shape whereby respective sub coding units are equally divided by four in directions of height and width.

Figure 8C:
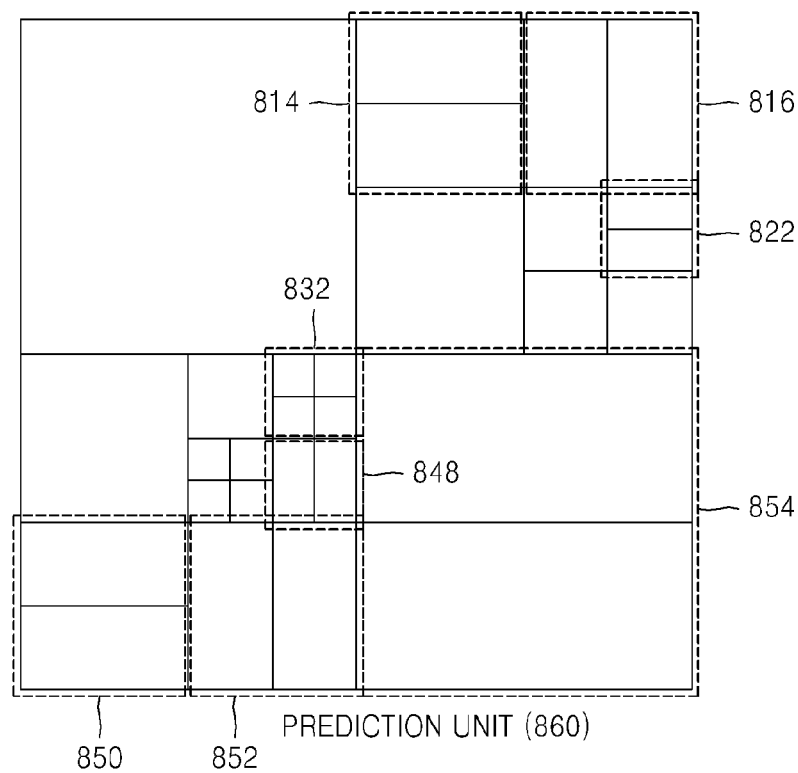
Figure 8D:
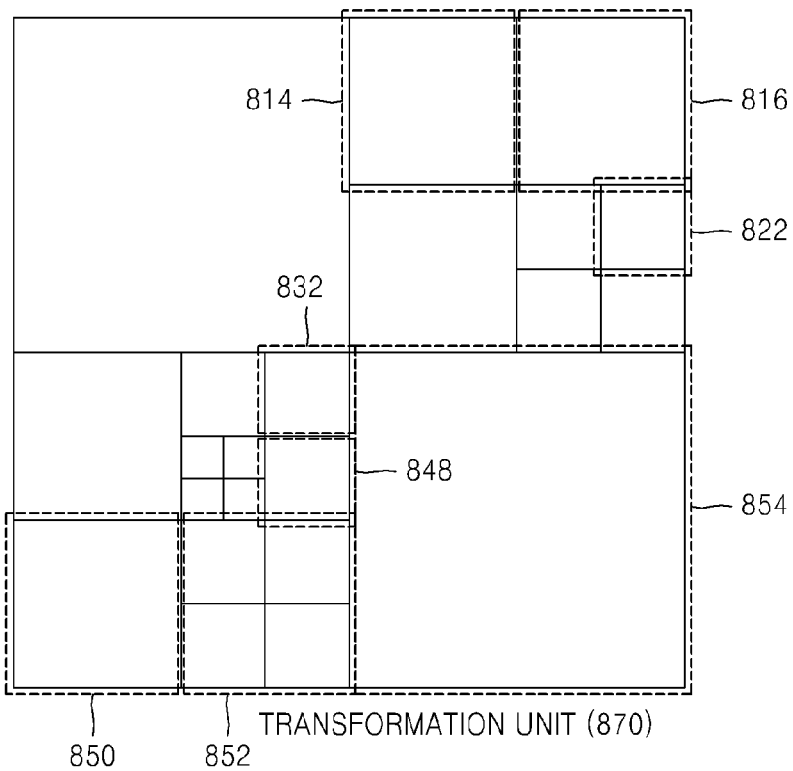

FIG. 8C illustrates a prediction unit 860 and FIG. 8D illustrates a transformation unit 870, according to an exemplary embodiment. It is noted that FIGS. 8B and 8C show the same prediction unit 860 for convenience of explanation and comparison to the coding unit 810 and the transformation unit 870.

FIG. 8C illustrates a division shape of a prediction unit for the maximum coding unit 810 illustrated in FIG. 8A, and FIG. 8D illustrates a division shape of a transformation unit 870 of the maximum coding unit 810.

Referring to FIG. 8D, a division shape of a transformation unit 870 may be set differently from the prediction unit 860.

For example, even though a prediction unit for the coding unit 854 whose depth is 1 is selected with a shape whereby the height of the coding unit 854 is equally divided by two, a transformation unit may be selected with the same size as the coding unit 854. Likewise, even though prediction units for coding units 814 and 850 whose depths are 2 are selected with a shape whereby the height of each of the coding units 814 and 850 is equally divided by two, a transformation unit may be selected with the same size as the original size of each of the coding units 814 and 850.

A transformation unit may be selected with a smaller size than a prediction unit. For example, when a prediction unit for the coding unit 852 whose depth is 2 is selected with a shape whereby the width of the coding unit 852 is equally divided by two, a transformation unit may be selected with a shape whereby the coding unit 852 is equally divided by four in directions of height and width, which has a smaller size than the shape of the prediction unit.

Figure 9A:
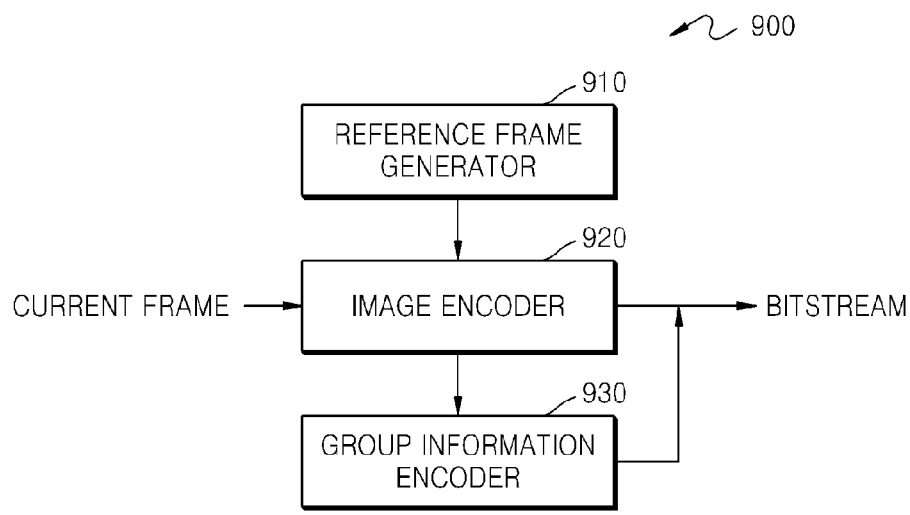
FIG. 9A is a block diagram of an apparatus for encoding an image, according to another exemplary embodiment.

FIG. 9A is a block diagram of an apparatus 900 for encoding an image, according to another exemplary embodiment.

Referring to FIG. 9A, the apparatus 900 includes a reference frame generator 910, an image encoder 920, and a group information encoder 930.

The reference frame generator 910 generates at least one reference frame to be used to encode a current block. The current block may be any encoding unit from among the coding units having various sizes illustrated in FIG. 8A.

The apparatus 900 refers to at least one frame in order to encode the current block. For example, when inter prediction is performed on the current block, the apparatus 900 refers to at least one frame encoded previous to the current block for single-directional or bi-directional prediction, in order to encode the current block.

According to another exemplary embodiment, the apparatus 900 may refer to a frame generated from the frame encoded previous to the current block, as described in detail below with reference to FIG. 10.

Figure 10:
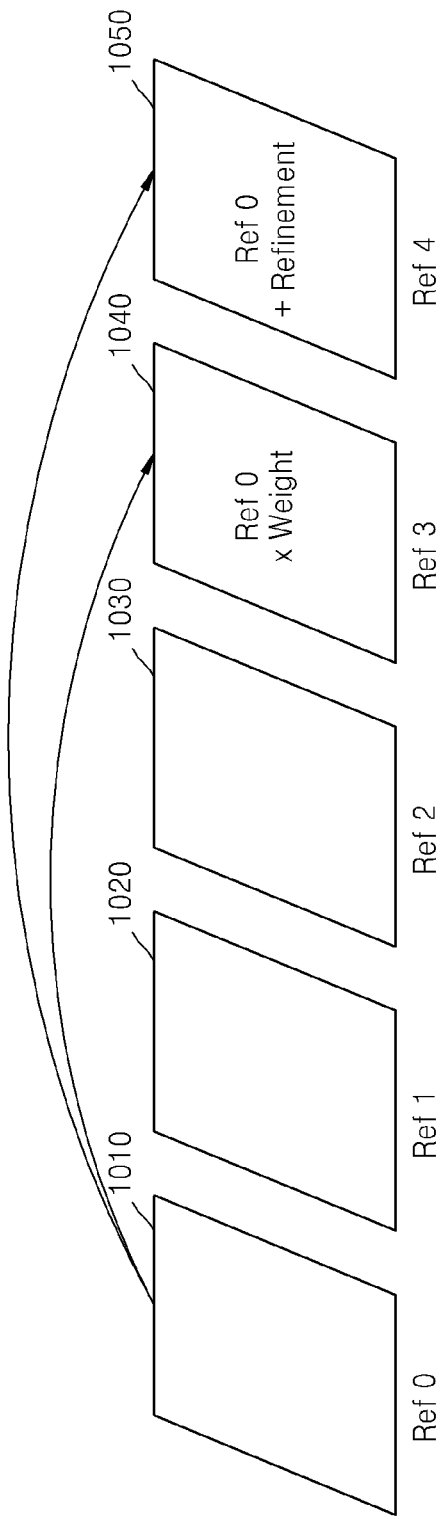
FIG. 10 illustrates a reference frame according to an exemplary embodiment.

FIG. 10 illustrates a reference frame according to an exemplary embodiment.

Referring to FIGS. 9A and 10, the apparatus 900 may generate at least one of a frame of List 0, i.e., a reference frame that is earlier than the current frame including the current block, and a frame of List 1, i.e., a reference frame that is later than the current frame. From among frames of List 0 and List 1, frames 1010 through 1030 are frames encoded previous to the current frame.

If the frames 1010 through 1030 that are frames encoded previous to the current block are frames Ref0, Ref1, and Ref2 1010 through 1030, the reference frame generator 910 generates at least one of the frames 1040 and 1050 (hereinafter, referred to as frame Ref3 1040 and frame Ref4 1050) based on at least one of the frames Ref0, Ref1 and Ref2 1010 through 1030.

In FIG. 10, the reference frame generator 910 generates the frame Ref3 1040 by multiplying pixel values of the frame Ref0 1010 by a predetermined weight, and generates the frame Ref4 1050 that is refined by adding a predetermined value to the pixel values of the frame Ref0 1010.

FIG. 10 illustrates an exemplary method of generating a reference frame, but it will be easily understood by those of ordinary skill in the art that a reference frame may be generated using various methods, apart from the method illustrated in FIG. 10, in one or more other exemplary embodiments. For example, according to another exemplary embodiment, a reference picture may be generated by combining the frame Ref0 1010 and the frame Ref1 1020. The reference frame may be generated by multiplying the pixel values of the frame Ref0 1010 by a weight w (where w is equal to or greater than 0, and is equal to or less than 1), multiplying pixel values of the Ref1 frame 1020 by a weight 1−w, and adding both the weighted frames. Moreover, the reference frame may be generated by performing a geometric transformation on a frame encoded previous to the current frame. The geometric transformation may include at least one of homogeneous transformation, perspective transformation and affine transformation.

Referring back to FIG. 9A, the image encoder 920 encodes the current block with reference to the frame encoded previous to the current frame, and at least one frame generated by the reference frame generator 910.

The image encoder 920 encodes the current block based on a predetermined group (hereinafter, referred to as reference index group) including at least one of the frame encoded previous to the current frame and at least one frame generated by the reference frame generator 910.

In more detail, when the current block is encoded with reference to frames included in the same reference index group, references to the frames are considered as the same references. For example, if the Ref 0 frame 1010 and the Ref 3 frame 1040 are included in the same reference index group, a reference to the Ref 3 frame 1040 is considered to be the same as a reference to the Ref 0 frame 1010 when a motion vector of the current block is encoded or when a boundary strength (Bs) is determined, in order to encode the current block. An exemplary method of setting the reference index group is described in detail below with reference to FIG. 12. A method of encoding the current block based on the reference index group according to one or more exemplary embodiments is described in detail below with reference to FIGS. 11A through 11D and 13.

The group information encoder 930 encodes information about the reference index group set by the image encoder 920. At least one of information indicating whether a reference frame generated by the reference frame generator 910 is used for encoding, information about a frame included in the reference index group, and information about a method of generating a reference frame by modifying a frame encoded previous to the current frame may be encoded.

The information about the frame included in the reference index group may include information indicating which frames are grouped into the reference index group from among the frames Ref0, Ref1, Ref2, Ref3, and Ref4 1010 through 1050 of FIG. 10.

The information about the method of generating the reference frame may include information indicating which method is used to generate the reference frame from among weight multiplication, refinement, and geometric-transformation. When the weight multiplication is used to generate the reference frame, the information about the reference index group may include information about a weight. When the refinement is used to generate the reference frame, the information about the reference index group may include information about a predetermined value used in the refinement. When the affine-transformation is used to generate the reference frame, the information about the reference index group may include information about parameters (e.g., a vector indicating two-dimensional (2D) motion, a rotary angle indicating rotary motion, a scaling value indicating a degree of magnification or reduction, etc.) of the affine-transformation.

The information about the reference index group may be encoded as a sequence parameter, a slice parameter, or a block parameter.

According to another exemplary embodiment, the reference frame may be generated and the reference index group may be set based on a rule that is shared by an encoding side and a decoding side, without explicitly encoding the information about the reference index group. That is, without explicitly encoding the information about the frame included in the reference index group and the information about the method of generating the reference frame, the reference frame may be generated and the reference index group may be set based on a rule that is shared by the encoding side and the decoding side.

Figure 9B:
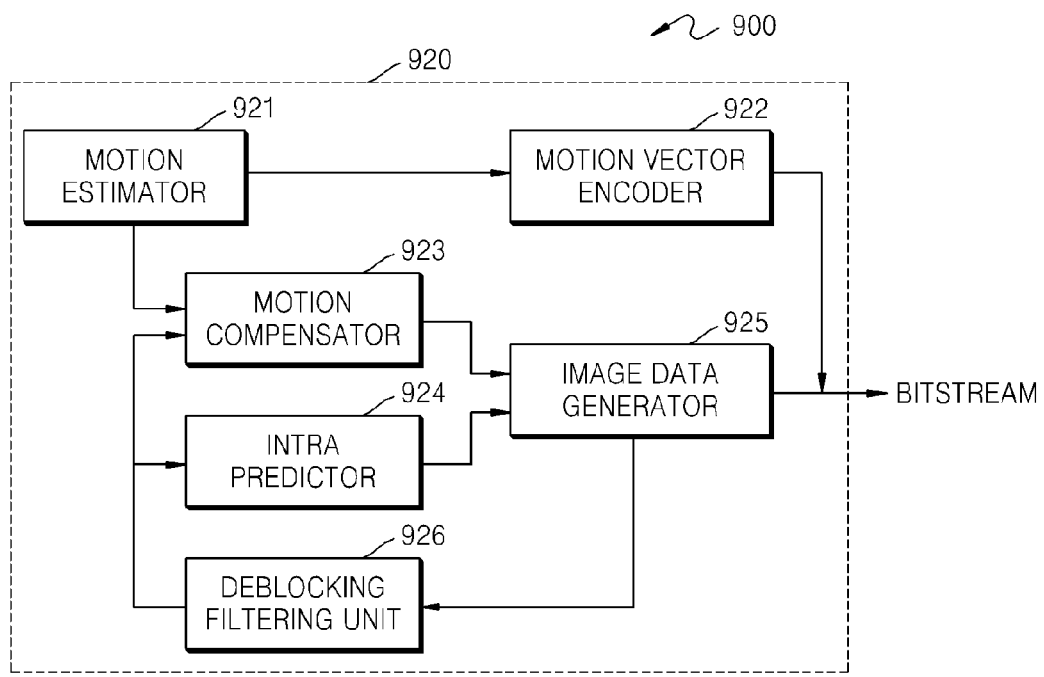
FIG. 9B is a block diagram of an image encoder according to an exemplary embodiment.

FIG. 9B is a block diagram of an image encoder 920 according to an exemplary embodiment.

Referring to FIG. 9B, the image encoder 920 includes a motion estimator 921, a motion vector encoder 922, a motion compensator 923, an intra predictor 924, an image data generator 925, and a deblocking filtering unit 926.

The motion estimator 921 estimates a motion vector of the current block with reference to at least one of the frames Ref0, Ref1, and Ref2 1010 through 1030 that are encoded previous to the current block and the frames Ref3, and Ref4 1040 and 1050 that are generated. The motion estimator 921 searches the frames Ref0, Ref1, Ref2, Ref3, and Ref4 1010 through 1050 for a similar block to the current block, and calculates the motion vector of the current block according to a search result. For example, the motion estimator 921 may search for a block of which a sum of absolution differences (SAD) with respect to pixel values of the current block is smallest, and may calculate a relative-position difference between the found block and the current block.

The motion vector encoder 922 encodes the motion vector based on a motion estimation result of the motion estimator 921. The motion vector encoder 922 prediction-encodes the motion vector generated based on the motion estimation result.

The motion vector encoder 922 prediction-encodes the motion vector of the current block by using motion vectors of blocks included in a previously encoded area adjacent to the current block as a motion vector predictor that is a prediction value of a motion vector. The motion vector of the current block may be predicted based on a median of motion vectors of blocks encoded previous to the current block, and the motion vector may be prediction-encoded based on a prediction result.

However, when the current block refers to a plurality of frames, a frame that is referred to by the current block may be different from a frame that is referred to by a previously encoded block adjacent to the current block. In this case, the motion vector of the current block may be estimated based on a motion vector of a block of which a reference frame is the same as the current block. This is described in detail below with reference to FIGS. 11A through 11C.

FIGS. 11A through 11D illustrate a current block, and previously encoded blocks adjacent to the current block, according to one or more exemplary embodiments.

Figure 11A:
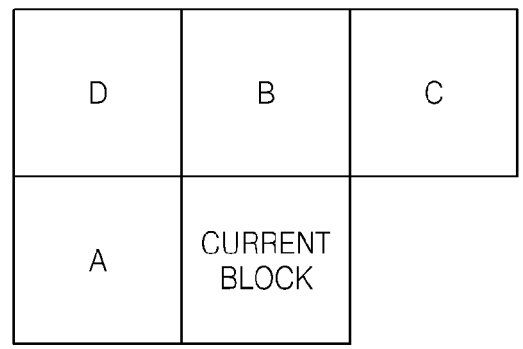
FIGS. 11A through 11D illustrate a current block, and previously encoded blocks adjacent to the current block, according to one or more exemplary embodiments.

Referring to FIG. 11A, the motion vector encoder 922 uses motion vectors of blocks A, B, C and D included in a previously encoded area adjacent to the current block in order to predict the motion vector of the current block. In this case, a median of the motion vectors of the blocks A, B, C and D may be a motion vector predictor of the current block. Alternatively, a median of the blocks A, B and C, but not the block D, may be a motion vector predictor of the current block.

Figure 11B:
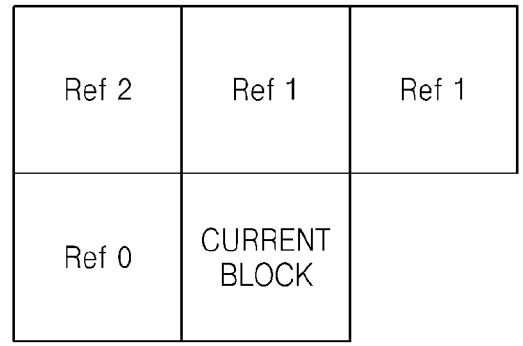

Referring to FIG. 11B, when the current block refers to the frame Ref0 1010 of FIG. 10, as a motion estimation result of the motion estimator 921, the motion vector of the block A referring to the same frame as the reference frame of the current block is used as the motion vector predictor of the current block.

Figure 11C:
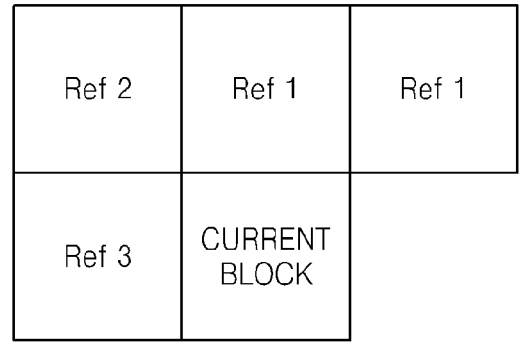

Referring to FIG. 11C, when the current block refers to a reference frame Ref0 1010, there is no block that refers to the same frame as the current block from among the blocks A, B, C, and D adjacent to the current block. However, according to an exemplary embodiment, when there is a block that refers to a frame included in a group including a reference frame of the current block from among the previously encoded blocks A, B, C and D adjacent to the current block, the motion vector of the current block may be predicted based on a motion vector of a block that refers to the frame included in the group including the reference frame of the current block. This is described with reference to FIG. 12.

FIG. 12 illustrates a reference index group 1200 of reference frames according to an exemplary embodiment.

Referring to FIG. 12, the motion vector encoder 922 prediction-encodes the motion vector of the current block by using a reference index group 1200 that is generated by grouping a plurality of reference frames into a single group.

In FIG. 11B, when the motion vector of the current block is estimated with reference to the frame Ref3 1040, a motion vector of the block A that refers to the frame Ref0 1010 included in the reference frame group 1200 including the Ref3 frame 1040 from among blocks adjacent to the current block may be used as a motion vector predictor of the current block.

In FIG. 11C, when the motion vector of the current block is estimated with reference to the frame Ref0 1010, the motion vector of the block A that refers to the frame Ref3 1040 included in the reference index group 1200 including the frame Ref0 1010 from among the blocks adjacent to the current block may be used as the motion vector predictor of the current block.

Figure 11D:
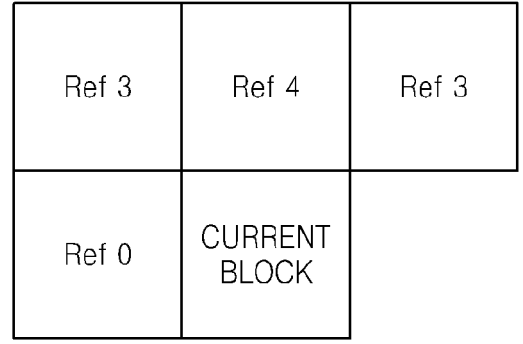

In FIG. 11D, when the motion vector of the current block is estimated with reference to the frame Ref0 1010, blocks adjacent to the current block refer to reference frames included in the reference frame group 1200. That is, the block A adjacent to a left side of the current block refers to the frame Ref0 1010 included in a group including the frame Ref 0 1010, the block B adjacent to an upper side of the current block refers to the frame Ref4 1050 included in the group including the frame Ref 0 1010, and the blocks C and D that are respectively adjacent to upper-right and upper-left sides of the current block refer to the frame Ref3 1040 included in the group including the frame Ref 0 1010. Thus, as illustrated in FIG. 11D, when previously encoded blocks adjacent to the current block refer to frames included in the group including the frame Ref 0 1010, the motion vector of the current block may be predicted based on a median of the motion vectors of the blocks A, B, C and D.

In a related art, if a reference frame of a block adjacent to the current block is different from the current block, a motion vector of the current block may not be predicted based on the motion vector of the block adjacent to the current block. However, according to an exemplary embodiment, a plurality of reference frames are grouped into the same reference index group, and reference frames included in the same reference index group are considered as the same frames when the motion vector of the current block is predicted. Specifically, since the frame Ref0 1010 is the same as or similar to the frame Ref3 or Ref4 1040 or 1050 generated based on a predetermined reference frame, the frames Ref0, Ref3, and Ref4 1010, 1040 and 1050 are grouped into a single reference index group based on this similarity, and are used to predict the motion vector of the current block. Thus, a motion vector may be efficiently compression-encoded while the number of reference frames is increased.

If the similarity between reference frames is disregarded, and the reference frames are not used to predict the motion vector of the current block when indexes of the reference frames are different, the motion vector is incorrectly predicted. Thus, a compression ratio for encoding an image may be decreased. However, according to an exemplary embodiment, a reduction in the compression ratio may be prevented.

Furthermore, when the current block is a coding unit that decreases according to a depth, as illustrated in FIG. 8A, a motion vector of a block adjacent to a lower-left side of the current block, as well as motion vectors of blocks adjacent to left, upper-left, upper and upper-right sides of the current block, may be used to predict the current block. That is, when encoding is performed according to the coding unit illustrated in FIG. 8A, a coding unit of the lower-left side of the current block may also be encoded previous to the current block.

It is understood that the reference index group 1200 illustrated in FIG. 12 is exemplary, and thus the frame Ref0 1010 and the frames Ref3 and Ref4 1040 and 1050 generated by modifying the frame Ref0 1010 may not be grouped into the same group in another exemplary embodiment. For example, at least one of the frame Ref0 1010 and the frames Ref1 and Ref2 1020 and 1030 may be set as a single reference index group, instead of setting the reference frames as illustrated in FIG. 12.

Moreover, a plurality of reference index groups may be set. For example, with reference to FIG. 12, the frame Ref0 1010, the frame Ref3 1040, and the frame Ref4 1050 may be grouped into the reference index group 1200, and the remaining frames, i.e., the frame Ref1 1020 and the frame Ref2 1030 may be grouped into another reference index group.

Referring back to FIG. 9B, the motion compensator 923 performs inter prediction on the current block based on the motion vector estimated by the motion estimator 921. A prediction block is generated based on a block of a reference frame, which is found based on the estimated motion vector.

The intra predictor 924 generates the prediction block of the current block by using pixel values of the current frame included in a previously encoded area adjacent to the current block.

The image data generator 925 prediction-encodes the current block based on an inter prediction result of the motion compensator 923, or an intra prediction result of the intra predictor 924. A residual block is generated by subtracting the prediction block that is generated based on the inter prediction result or the intra prediction result from the current block. A bitstream is generated by transforming (e.g., using DCT) the generated residual block, and quantizing and entropy-encoding frequency domain coefficients generated as a result of the transforming.

The quantized frequency domain coefficients are decoded so as to be used to encode a next block or a next frame. The residual block is restored by inverse-quantizing and inverse-transforming (e.g., using Inverse Discrete Cosine Transformation (IDCT)) the quantized frequency domain coefficients, and the current block is restored by adding the restored residual block and the prediction block. The restored current block is deblocking-filtered by the deblocking filtering unit 926 for deblocking between the neighboring blocks, and is used to encode a next block or a next frame.

According to an exemplary embodiment, the deblocking filtering unit 926 may use the reference index group 1200 in order to set a boundary strength (Bs), as is described in detail with reference to FIG. 13.

Figure 13:
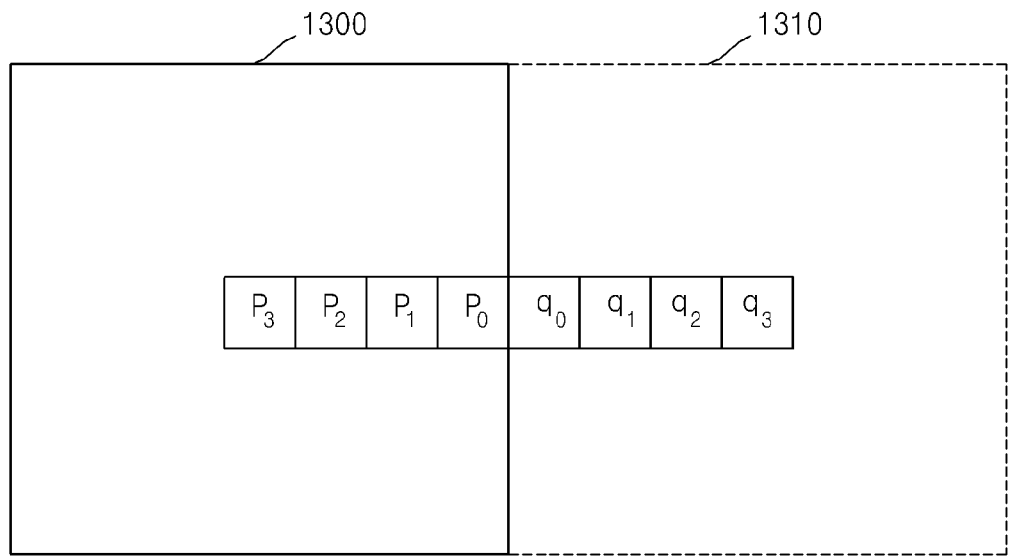
FIG. 13 illustrates a deblocking-filtering method according to an exemplary embodiment.

FIG. 13 illustrates a deblocking-filtering method according to an exemplary embodiment.

In a related art, when a boundary strength (Bs) between a current block 1300 and an adjacent block 1310 adjacent to the current block is set, whether the current block 1300 and the adjacent block 1310 refer to the same frame is considered. When the current block 1300 and the adjacent block 1310 refer to different frames, since blocking artifacts may be formed at a boundary between the current block 1300 and the adjacent block 1310, deblocking filtering is performed with a high boundary strength (Bs). However, when the current block 1300 and the adjacent block 1310 refer to the same frame, since blocking artifacts may not be formed at the boundary, deblocking filtering is performed with a low boundary strength (Bs).

However, according to an exemplary embodiment, similar frames are grouped into the reference index group 1200, and a reference to a frame included in the reference index group 1200 is considered to be the same as a reference to another frame included in the reference index group 1200, as described with reference to FIG. 12. Thus, even if the current block 1300 and the adjacent block 1310 refer to different frames, if the different frames are included in the same reference index group, the current block 1300 and the adjacent block 1310 are considered as blocks referring to the same frame, and a boundary strength (Bs) is set accordingly.

For example, when the reference index group 1200 is set as illustrated in FIG. 12, if the current block 1300 refers to the frame Ref 0 1010, and the adjacent block 1310 refers to the frame Ref 3 1040, since the current block 1300 and the adjacent block 1310 refer to frames included in the same reference index group 1200, deblocking filtering is performed between the current block 1300 and the adjacent block 1310 with a low boundary strength (Bs).

Though FIG. 13 illustrates a case where deblocking filtering is performed at a horizontal boundary, it is understood that another exemplary embodiment is not limited thereto, and may, for example, perform the deblocking filtering at a vertical boundary using the same or similar method as in FIG. 13.

Figure 14:
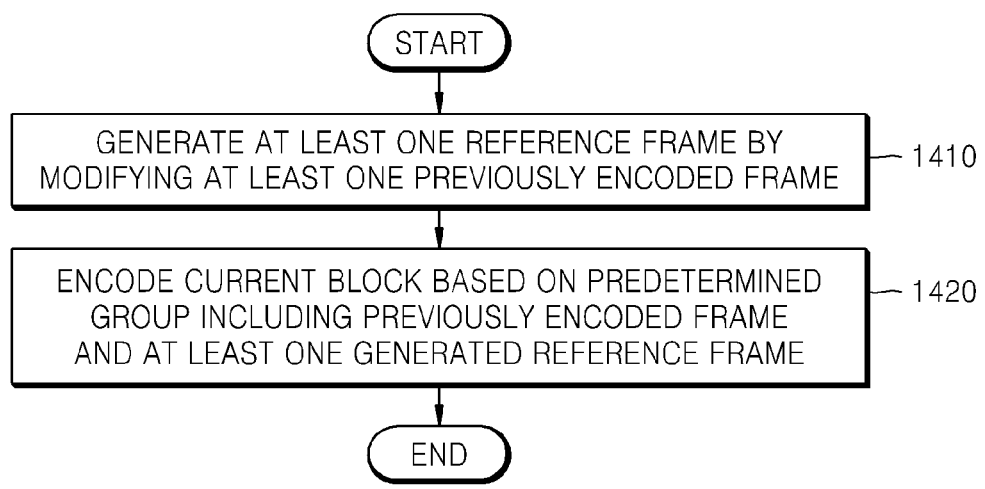
FIG. 14 is a flowchart of a method of encoding an image according to an exemplary embodiment.

FIG. 14 is a flowchart of a method of encoding an image according to an exemplary embodiment.

Referring to FIG. 14, in operation 1410, an image encoding apparatus according to an exemplary embodiment generates at least one frame by modifying at least one frame encoded previous to a current frame.

In operation 1420, the image encoding apparatus encodes the current block based on a reference index group including at least one of the at least one frame encoded previous to a current frame and the at least one frame generated in operation 1410. When the current block is encoded, a reference to a first frame included in the reference index group is considered to be the same as a reference to another frame included in the reference index group. Accordingly, a motion vector of the current block may be prediction-encoded or a boundary strength (Bs) for deblocking filtering at a boundary between the current block and an adjacent block may be set based on the reference index group.

A single reference index group may include a second frame (e.g., the frame Ref0 1010 of FIG. 12) and at least one frame generated by modifying the second frame (e.g., the frame Ref 3 1040 and the frame Ref 4 1050 of FIG. 12). The first frame that is referred to in order to encode the current block may be the second frame or a frame generated by modifying the second frame.

As described with reference to FIG. 10, the generated frame may be a frame generated by multiplying pixel values of the second frame by a predetermined weight, a frame generated by adding a predetermined value to the pixel values of the second frame, or a frame generated by performing geometric-transformation on the second frame.

A method of encoding a motion vector according to an exemplary embodiment will now be described. The image encoding apparatus searches the first frame to estimate a motion vector of the current block. For example, the image encoding apparatus may search the first frame for a block having a smallest SAD, and estimates the motion vector according to a result of the search. The first frame may be any one of the frames Ref0, Ref1, Ref2, Ref3, and Ref4 1010 through 1050 that may be searched in order to perform inter prediction on the current block.

Furthermore, the image encoding apparatus predicts the motion vector of the current block based on a motion vector of another block that refers to another frame included in the same index group as the first frame from among at least one previously encoded block adjacent to the current block. When the motion vector is predicted, the frames Ref0, Ref1, Ref2, Ref3, and Ref4 1010 through 1050 included in the reference index group 1200 of FIG. 12 are considered as the same frame. A method of predicting a motion vector according to one or more exemplary embodiments has been described above with reference to FIGS. 11A through 11D and 12.

When the motion vector is predicted, the motion vector of the current block is encoded according to a prediction result of the motion vector. A difference value is generated by subtracting a motion vector predictor from the motion vector of the current block, and is encoded. The difference value is entropy-encoded to generate a bitstream.

Moreover, the image encoding apparatus may perform motion compensation on the current block based on the estimate motion vector to generate a prediction block of the current block, and subtracts the generated prediction block from the current block to generate a residual block. Pixel values of the current block are encoded by transforming (e.g., DCT) the generated residual block, and quantizing and entropy-encoding frequency domain coefficients.

A deblocking filtering method according to an exemplary embodiment will now be described. The image encoding apparatus determines whether the current block and the adjacent block refer to frames included in the same group. According to a determination result, a boundary strength (Bs) for deblocking filtering is set. When the current block is encoded with reference to the first frame, and the adjacent block refers to a frame included in the same group as the first frame, the current block and the adjacent block are considered as blocks referring to the same frame, and the boundary strength (Bs) is set accordingly. According to the set boundary strength (Bs), deblocking filtering is performed on a boundary between the current block and the adjacent block. Moreover, in operation 1420, the image encoding apparatus may encode information about the reference index group. The encoded information about the reference index group according to an exemplary embodiment has been described above with reference to the group information encoder 930 of FIG. 9A. The information about the reference index group may include information specifying a frame included in the reference index group. However, it is understood that another exemplary embodiment is not limited thereto. For example, according to another exemplary embodiment, when the reference index group is set according to a rule that is shared by an encoding side and a decoding side, the information about the frame included in the reference index group may not be encoded.

Figure 15A:
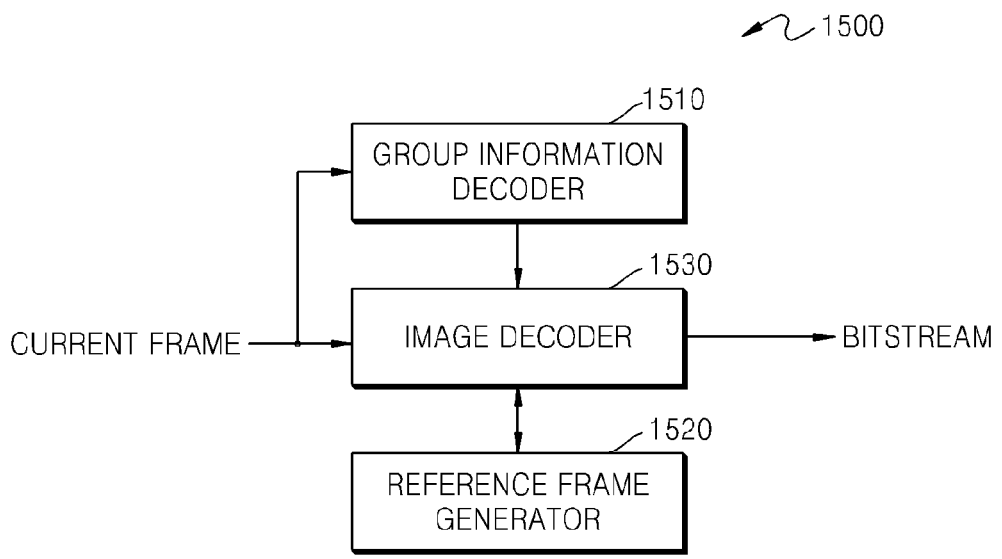
FIG. 15A is a block diagram of an apparatus for decoding an image according to another exemplary embodiment.

FIG. 15A is a block diagram of an apparatus 1500 for decoding an image according to another exemplary embodiment.

Referring to FIG. 15A, the apparatus 1500 includes a group information decoder 1510, a reference frame generator 1520, and an image decoder 1530.

The group information decoder 1510 decodes information about a reference index group. The information about the reference index group, which may be encoded by the group information encoder 930 according to an exemplary embodiment described above with reference to FIG. 9A, is decoded.

Information indicating whether a frame generated by the reference frame generator 910 is used for encoding, information about a frame included in the reference index group, and information about a method of generating a reference frame by modifying a frame encoded previous to the current frame may be decoded.

As described above with reference to FIG. 9A, when the information about the reference index group is not included in a bitstream, the group information decoder 1510 may not decode the information about the reference index group.

The reference frame generator 1520 generates a reference frame by using at least one frame decoded previous to the current frame. As describe with reference to FIG. 10, the reference frame may be generated by multiplying pixel values of the previously decoded frame by a predetermined weight, or by adding a predetermined value to the previously decoded frame. Furthermore, the reference frame may be generated by performing a geometric transformation on the previously decoded frame. The geometric may include at least one of homogeneous transformation, perspective transformation and affine transformation The image decoder 1530 decodes the current block based on the reference index group including at least one of the previously decoded frame and at least one frame generated by the reference frame generator 1520. When the current block is decoded, a reference to a first frame included in the reference index group is considered to be the same as a reference to another frame included in the reference index group, as described in detail with reference FIG. 15B.

Figure 15B:
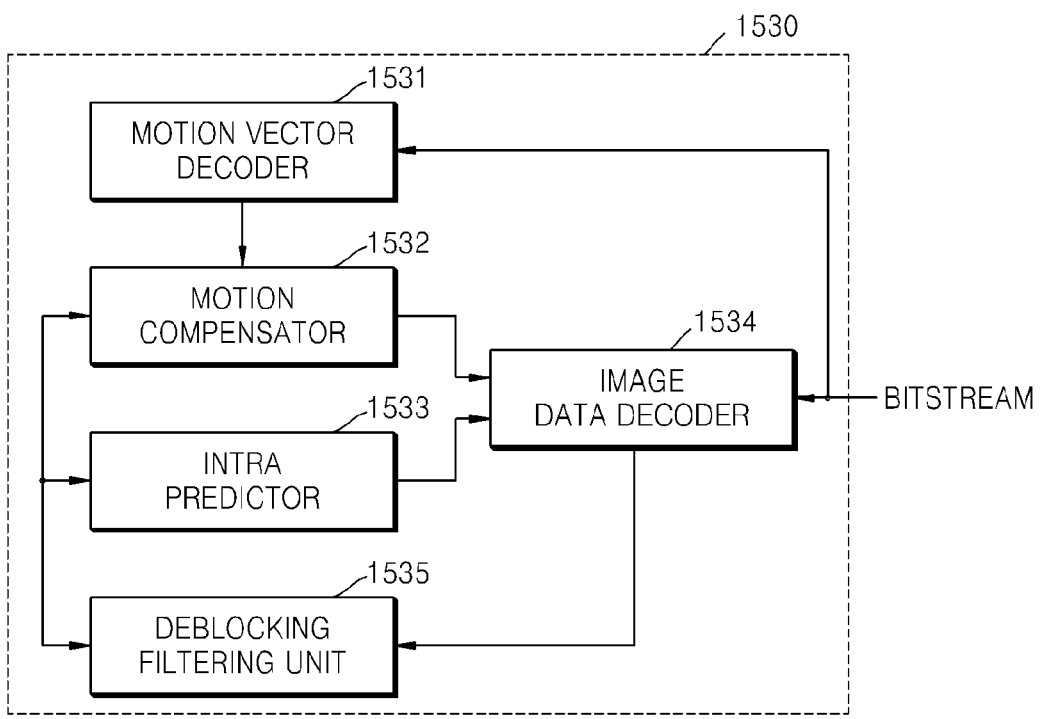
FIG. 15B is a block diagram of the image decoder according to an exemplary embodiment.

FIG. 15B is a block diagram of an image decoder 1530 according to an exemplary embodiment.

Referring to FIG. 15B, the image decoder 1530 includes a motion vector decoder 1531, a motion compensator 1532, an intra predictor 1533, an image data decoder 1534, and a deblocking filtering unit 1535.

The motion vector decoder 1531 decodes a difference value between the motion vector of a current block and a motion vector predictor. Data about the motion vector from a bitstream is decoded. The difference value between the motion vector and the motion vector predictor is decoded by entropy-decoding the data about the motion vector.

The motion vector decoder 1531 predicts the motion vector of the current block based on a motion vector of a previously decoded block adjacent to the current block. As described above with reference to FIGS. 10, 11A through 11D, and 12, the motion vector of the current block may be predicted based on a motion vector of a block that refers to a frame included in a group including the first frame that is a reference frame of the current block from among adjacent blocks.

The reference index group may be set by grouping the same or similar frames, for example, a second frame and frames generated by modifying the second frame. Even if a frame that is referred to for inter prediction of adjacent blocks is not the same as the first frame, when the frame and the first frame are included in the same group, motion vectors of the adjacent blocks may be used to predict the motion vector of the current block. As described above, the first frame may be the second frame or a frame generated by modifying the second frame.

When a motion vector predictor is generated by predicting the motion vector of the current block, the motion vector decoder 1531 restores the motion vector of the current block by adding the difference value between the decoded motion vector and the motion vector predictor, and the motion vector predictor.

The motion compensator 1532 generates a prediction block of the current block based on the motion vector of the current block that is restored by the motion vector decoder 1531. A reference frame is searched according to the restored motion vector, and the prediction block is generated based on a result of the search.

The intra predictor 1533 generates the prediction block of the current block by using pixel values included in previously decoded area adjacent to the current block. The image data decoder 1534 restores the current block by decoding the data about the current block. Frequency domain coefficients are generated by entropy-decoding and inverse-quantizing the data about the current block. A residual block of a pixel domain is restored by inverse-transforming (e.g., IDCT) the frequency domain coefficients.

The current block is restored by adding the restored residual block and the prediction block generated by the motion compensator 1532 or the intra predictor 1533.

The current block restored by the image data decoder 1534 is deblocking-filtered by the deblocking filtering unit 1535, and is used to decode a next block or a next frame.

According to an exemplary embodiment, the deblocking filtering unit 1535 may use the reference index group in order to set a boundary strength (Bs) of deblocking filtering. A method of setting of the boundary strength (Bs) has been described above with reference to FIG. 13.

Figure 16:
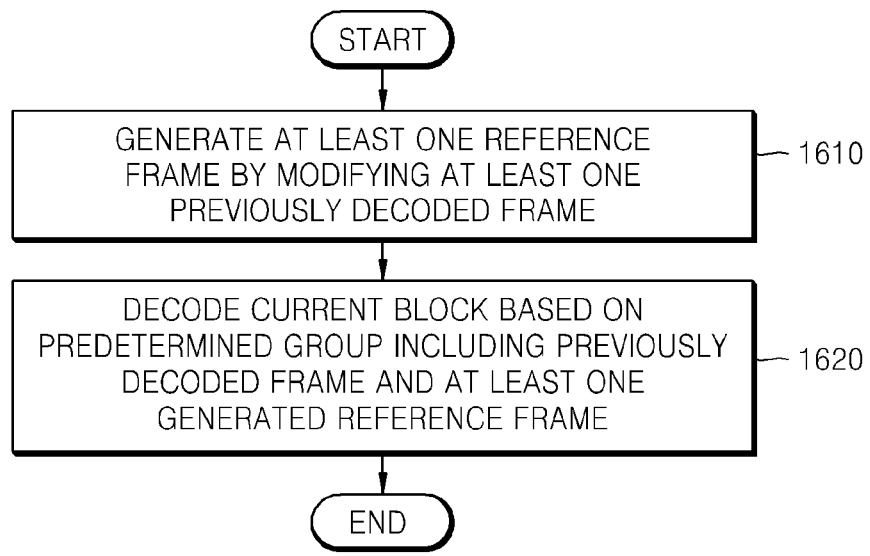
FIG. 16 is a flowchart of a method of decoding an image according to an exemplary embodiment.

FIG. 16 is a flowchart of a method of decoding an image according to an exemplary embodiment.

Referring to FIG. 16, in operation 1610, an image decoding apparatus according to an exemplary embodiment generates a reference frame by modifying at least one frame decoded previous to a current frame. As described above with reference to FIG. 10, the reference frame may be generated by multiplying pixel values of the previously decoded frame by a predetermined weight or by adding a predetermined value to the previously decoded frame. The reference frame may be generated by performing a geometric transformation on the previously decoded frame.

While an image is encoded, if information about a reference index group is separately encoded, the information about the reference index group is decoded, and the reference frame is generated. For example, information about frames included in the reference index group may be decoded, and the reference frame may be generated based on the information about the frames included in the reference index group. However, as described above, when the reference index group is set according to a rule that is shared by an encoding side and a decoding side, a frame included in the reference index group may be generated according to the rule without decoding the information about the reference index group.

In operation 1620, the image decoding apparatus decodes the current block based on the reference index group including at least one of the previously decoded frame and at least one frame generated in 1610. When the current block is decoded, a first frame included in the reference index group is considered to be the same as another frame included in the reference index group. Accordingly, a motion vector of the current block is prediction-decoded or a boundary strength (Bs) for deblocking filtering at a boundary between the current block and an adjacent block is set based on the reference index group.

A method of decoding a motion vector according to an exemplary embodiment will now be described. An image decoding apparatus decodes a difference value between the motion vector of the current block and a motion vector predictor. The difference value is restored by entropy-decoding a bitstream about the difference value.

Moreover, the image decoding apparatus predicts the motion vector of the current block based on a motion vector of another block that refers to another frame included in the same group as a block that is referred to for performing inter prediction by the current block, e.g., a first block from among at least one previously decoded block adjacent to the current block. As described above with reference to FIGS. 11A through 11D and 12, the motion vector of the current block is predicted based on a motion vector of another block that refers to a frame included in a group including a second frame and at least one reference frame generated by modifying the second frame from among blocks adjacent to the current block.

When the motion vector is predicted, the motion vector is restored by adding the motion vector predictor and the difference value between the motion vector of the current block and the motion vector predictor.

As described above with reference to FIG. 15B, the image decoding apparatus sets a boundary strength (Bs) for deblocking filtering based on the reference index group, and performs deblocking filtering on a boundary between the current block and a block adjacent to the current block according to the set boundary strength (Bs).

While not restricted thereto, an exemplary embodiment may be implemented using a computer readable code in a computer readable recording medium.

For example, an apparatus for encoding an image and an apparatus for decoding an image, according to exemplary embodiments, may include a bus coupled to units of at least one of the devices shown in FIGS. 1, 2, 4, 5, 9A, 9B, 15A, and 15B and at least one processor connected to the bus. In addition, a memory coupled to at least one processor for performing commands as described above may be included and connected to the bus to store the commands and received messages or generated messages.

The computer readable recording medium is any data storage device that may store data which may be thereafter read by a computer system. Examples of the computer readable recording medium include read-only memory (ROM), random-access memory (RAM), CD-ROMs, magnetic tapes, floppy disks and, optical data storage devices. The computer readable recording medium may also be distributed over network coupled computer systems so that the computer readable code is stored and executed in a distributed fashion.

While exemplary embodiments have been particularly shown and described, it will be understood by those of ordinary skill in the art that various changes in form and details may be made therein without departing from the spirit and scope of the present inventive concept as defined by the following claims.

What is claimed is:

1. A method of encoding an image, the method comprising:
generating a reference frame by modifying a previously encoded frame of the image; and
encoding a current block of a current frame based on a group comprising the previously encoded frame, which is encoded previous to both the current block and the reference frame, and the reference frame,
wherein the encoding the current block comprises:
estimating a motion vector of the current block by searching a first frame comprised in the group for a block which is similar to the current block;
predicting the motion vector of the current block based on a result of the searching and a motion vector of a block that refers to a second frame, different from the first frame, comprised in the group from among at least one previously encoded block adjacent to the current block; and
encoding the motion vector of the current block based on a result of the predicting, and
wherein the first frame and the second frame are comprised in a same group, and
wherein in the encoding the current block, a reference to the first frame is considered to be the same as a reference to the second frame.

2. The method of claim 1, wherein the first frame is the reference frame or the previously encoded frame.

3. The method of claim 1, wherein the predicting the motion vector comprises predicting the motion vector of the current block based on a median of motion vectors of a plurality of blocks that refer to one or more frames comprised in the group from among the at least one previously encoded block adjacent to the current block.

4. The method of claim 1, wherein the encoding the current block comprises prediction-encoding the current block based on the motion vector.

5. The method of claim 1, wherein the encoding the current block comprises:
determining whether the current block and a block adjacent to the current block both refer to one or more frames comprised in the group;
setting a boundary strength (Bs) for deblocking filtering based on a result of the determining; and
deblocking filtering a boundary between the current block and the block adjacent to the current block based on the boundary strength (Bs).

6. The method of claim 5, wherein the setting the boundary strength (Bs) comprises, when the current block is determined to refer to the first frame comprised in the group and the block adjacent to the current block is determined to refer to a second frame, different from the first frame, comprised in the group, considering that the current block and the block adjacent to the current block refer to the same frame when setting the boundary strength (Bs) for deblocking filtering.

7. The method of claim 1, wherein the generating the reference frame comprises generating the reference frame by at least one of adding a predetermined value to pixel values of the previously encoded frame and multiplying the previously encoded frame by a predetermined value.

8. The method of claim 1, wherein the generating the reference frame comprises generating the reference frame by performing a geometric transformation on the previously encoded frame, and wherein the geometric transformation include at least one of homogeneous transformation, perspective transformation and affine transformation.

9. The method of claim 1, wherein the encoding the current block comprises encoding information about frames comprised in the group.

10. The method of claim 9, wherein the information about the frames comprises information about a method of generating the reference frame by modifying the previously encoded frame.

11. The method of claim 1, wherein frames of the group are set according to a predetermined rule shared between an encoding side and a decoding side.

12. A computer readable recording medium storing a computer readable program for executing the method of claim 1.

13. The method of claim 1, wherein:
the image is hierarchically split from a plurality of maximum coding units according to the information about a maximum size of a coding unit into coding units of coded depths according to depths;
wherein a coding unit of a current depth is one of rectangular data units split from a coding unit of an upper depth;
wherein the coding unit of a current depth are split into coding units of a lower depth, independently from neighboring coding units; and
wherein the coding units of a hierarchical structure comprise encoded coding units among the coding units split from the maximum coding unit.

14. A method of decoding an image, the method comprising:
generating a reference frame by modifying a previously decoded frame of the image; and
decoding a current block of a current frame based on a group comprising the previously decoded frame, which is decoded previous to both the current block and the reference frame, and the reference frame,
wherein the decoding the current block comprises:
decoding a difference value between a motion vector of the current block and a motion vector predictor of a block which is similar to the current block;
predicting the motion vector of the current block that refers to a first frame based on a motion vector of a block that refers to a second frame, different from the first frame, comprised in the group from among at least one previously decoded block adjacent to the current block; and
restoring the motion vector of the current block based on the difference value and a result of the predicting, and
wherein the first frame and the second frame are comprised in a same group, and
wherein in the decoding the current block, a reference to the first frame is considered to be the same as a reference to the second frame.

15. The method of claim 14, wherein the first frame is the reference frame or the previously decoded frame.

16. The method of claim 14, wherein the predicting the motion vector comprises predicting the motion vector of the current block based on a median of motion vectors of a plurality of blocks that refer to one or more frames comprised in the group from among the at least one previously decoded block adjacent to the current block.

17. The method of claim 14, wherein the decoding the current block comprises prediction-decoding the current block based on the motion vector.

18. The method of claim 14, wherein the decoding the current block comprises:
determining whether the current block and a block adjacent to the current block both refer to one or more frames comprised in the group;
setting a boundary strength (Bs) for deblocking filtering based on a result of the determining; and
deblocking filtering a boundary between the current block and the block adjacent to the current block based on the boundary strength (Bs).

19. The method of claim 18, wherein the setting the boundary strength (Bs) comprises, when the current block is determined to refer to the first frame comprised in the group and the block adjacent to the current block is determined to refer to a second frame, different from the first frame, comprised in the group, considering that the current block and the block adjacent to the current block refer to the same frame when setting the boundary strength (Bs) for deblocking filtering.

20. The method of claim 14, wherein the generating the reference frame comprises generating the reference frame by at least one of adding a predetermined value to pixel values of the previously decoded frame and multiplying the previously decoded frame by a predetermined value.

21. The method of claim 14, wherein the generating the reference frame comprises generating the reference frame by performing a geometric transformation on the previously decoded frame, and wherein the geometric transformation include at least one of homogeneous transformation, perspective transformation and affine transformation.

22. The method of claim 14, wherein the generating the at least one reference frame comprises decoding information about frames comprised in the group.

23. The method of claim 14, wherein frames of the group are set according to a predetermined rule shared between an encoding side and a decoding side.

24. A computer readable recording medium storing a computer readable program for executing the method of claim 14.

25. An apparatus for encoding an image, the apparatus comprising:
a reference frame generator which generates a reference frame by modifying a previously encoded frame of the image;
an image encoder which encodes a current block of a current frame based on a group comprising the previously encoded frame, which is encoded previous to both the current block and the reference frame by the image encoder, and the reference frame,
wherein the image encoder is configured such that any reference to any frame in the group results in the same encoding, and the image encoder comprises:
a motion estimator which estimates a motion vector of the current block by searching a first frame comprised in the group for a block which is similar to the current block; and
a motion vector encoder which predicts the motion vector of the current block based on a result of the searching and a motion vector of a block that refers to a second frame, different from the first frame, comprised in the group from among at least one previously encoded block adjacent to the current block, and which encodes the motion vector of the current block based on a result of the predicting, wherein the first frame and the second frame are comprised in a same group, and wherein in the encoding the current block, a reference to the first frame is considered to be the same as a reference to the second frame.

26. The apparatus of claim 25, wherein the first frame is the reference frame or the previously encoded frame.

27. The apparatus of claim 25, wherein the image encoder comprises a deblocking filtering unit which determines whether the current block and a block adjacent to the current block both refer to one or more frames comprised in the group, which sets a boundary strength (Bs) for deblocking filtering based on a result of the determining, and which deblocking filters a boundary between the current block and the block adjacent to the current block based on the boundary strength (Bs).

28. The apparatus of claim 25, wherein the reference frame generator generates the reference frame by at least one of adding a predetermined value to pixel values of the previously encoded frame and multiplying the previously encoded frame by a predetermined value.

29. The apparatus of claim 25, wherein the reference frame generator generates the reference frame by performing a geometric transformation on the previously encoded frame, and wherein the geometric transformation include at least one of homogeneous transformation, perspective transformation and affine transformation.

30. The apparatus of claim 25, further comprising a group information encoder which encodes information about frames comprised in the group.

31. The apparatus of claim 25, wherein frames of the group are set according to a predetermined rule shared between an encoding side and a decoding side.

32. An apparatus for decoding an image, the apparatus comprising:

a reference frame generator which generates a reference frame by modifying a previously decoded frame of the image; and an image decoder which decodes a current block of a current frame based on a group comprising the previously decoded frame, which is decoded previous to both the current block and the reference frame, and the reference frame, wherein the image decoder is configured such that any reference to any frame in the group results in the same decoding, and the image decoder comprises:

a motion vector decoder which decodes a difference value between a motion vector of the current block and a motion vector predictor, which predicts the motion vector of the current block that refers to a first frame based on a motion vector of a block that refers to a second frame, different from the first frame, comprised in the group from among at least one previously decoded block adjacent to the current block, and which restores the motion vector of the current block based on the difference value and a result of the predicting, wherein the first frame and the second frame are comprised in a same group, and wherein in the decoding the current block, a reference to the first frame is considered to be the same as a reference to the second frame.

33. The apparatus of claim 32, wherein the first frame is the reference frame or the previously decoded frame.

34. The apparatus of claim 32, wherein the image decoder comprises a deblocking unit which determines whether the current block and a block adjacent to the current block both refer to one or more frames comprised in the group, which sets a boundary strength (Bs) for deblocking filtering based on a result of the determining, and which deblocking filters a boundary between the current block and the block adjacent to the current block based on the boundary strength (Bs).

35. The apparatus of claim 32, wherein the reference frame generator generates the reference frame by at least one of adding a predetermined value to pixel values of the previously decoded frame and multiplying the previously decoded frame by a predetermined value.

36. The apparatus of claim 32, wherein the reference frame generator generates the reference frame by performing a geometric transformation on the previously decoded frame, and wherein the geometric transformation include at least one of homogeneous transformation, perspective transformation and affine transformation.

37. The apparatus of claim 32, further comprising a group decoder which decodes information about frames comprised in the group.

38. The apparatus of claim 32, wherein frames of the group are set according to a predetermined rule shared between an encoding side and a decoding side.

39. A method of decoding an image, the method comprising:

decoding a current block of a current frame based on a group comprising a plurality of reference frames decoded previous to the current block, wherein the decoding the current block comprises:

decoding a difference value between a motion vector of the current block and a motion vector predictor of a block which is similar to the current block;

predicting the motion vector of the current block that refers to a first frame based on a motion vector of a block that refers to a second frame, different from the first frame, comprised in the group from among at least one previously decoded block adjacent to the current block; and restoring the motion vector of the current block based on the difference value and a result of the predicting, and wherein the first frame and the second frame are comprised in a same group, and wherein in the decoding the current block, a reference to the first frame is considered to be the same as a reference to the second frame.

40. A computer readable recording medium storing a computer readable program for executing the method of claim 39.

41. A method of encoding an image, the method comprising:

encoding a current block of a current frame based on a group comprising a plurality of reference frames encoded previous to the current block, wherein the encoding the current block comprises:

estimating a motion vector of the current block by searching a first frame comprised in the group for a block which is similar to the current block;

predicting the motion vector of the current block based on a result of the searching and a motion vector of a block that refers to a second frame, different from the first frame, comprised in the group from among at least one previously encoded block adjacent to the current block; and encoding the motion vector of the current block based on a result of the predicting, wherein in the encoding, any reference to any frame in the group results in the same encoding, and wherein in the encoding the current block, a reference to the first frame is considered to be the same as a reference to the second frame.

42. A computer readable recording medium storing a computer readable program for executing the method of claim 41.

\* \* \* \* \*